US011524625B2

(12) United States Patent
Fenske

(10) Patent No.: US 11,524,625 B2
(45) Date of Patent: Dec. 13, 2022

(54) ADAPTIVE VEHICLE HEADLIGHT

(71) Applicant: Texas Instruments Incorporated, Dallas, TX (US)

(72) Inventor: John Peter Fenske, Richardson, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 6 days.

(21) Appl. No.: 16/951,910

(22) Filed: Nov. 18, 2020

(65) Prior Publication Data

US 2021/0178960 A1 Jun. 17, 2021

Related U.S. Application Data

(60) Provisional application No. 62/947,199, filed on Dec. 12, 2019.

(51) Int. Cl.
*B60Q 1/14* (2006.01)
*G01S 17/86* (2020.01)
(Continued)

(52) U.S. Cl.
CPC .......... *B60Q 1/143* (2013.01); *F21S 41/141* (2018.01); *F21S 41/16* (2018.01); *G01S 17/86* (2020.01);
(Continued)

(58) Field of Classification Search
CPC .................. B60Q 1/143; B60Q 2300/21; B60Q 2300/31; B60Q 2300/312;
(Continued)

(56) References Cited

U.S. PATENT DOCUMENTS 10,066,799 B2 9/2018 Bhakta et al.
10,107,467 B2 10/2018 Bhakta
(Continued)

FOREIGN PATENT DOCUMENTS

EP 3726247 A1 * 10/2020 ............. G01S 17/18

OTHER PUBLICATIONS

Li et al., "Single DMD Intelligent Headlight with LiDAR," Proceedings of SPIE 11294, Emerging Digital Micromirror Device Based Systems and Applications XII, 112940H, Feb. 28, 2020, 7 pages.

(Continued)

*Primary Examiner* — Yuqing Xiao
*Assistant Examiner* — Benjamin Richard Hebert
(74) *Attorney, Agent, or Firm* — Michelle F. Murray; Charles A. Brill; Frank D. Cimino

(57) ABSTRACT

Example adaptive vehicle headlights are disclosed. An example system includes a photodetector, an illumination source configured to generate first light during a first operating mode, a spatial light modulator (SLM), and a dichroic filter optically coupled to the illumination source and to the SLM, wherein the dichroic filter is configured to direct the first light to the SLM, and the SLM is configured to direct second light to the dichroic filter during a second operating mode, wherein the dichroic filter is configured to direct the second light having a first color to the photodetector, and direct the first light during the first operating mode.

27 Claims, 14 Drawing Sheets

(51) Int. Cl.
  *G01S 17/931* (2020.01)
  *G01S 17/894* (2020.01)
  *F21S 41/141* (2018.01)
  *F21S 41/16* (2018.01)
  *H05B 45/24* (2020.01)

(52) U.S. Cl.
  CPC ...... *G01S 17/931* (2020.01); *B60Q 2300/312* (2013.01); *B60Q 2300/314* (2013.01); *G01S 17/894* (2020.01); *H05B 45/24* (2020.01)

(58) Field of Classification Search
  CPC .. B60Q 2300/314; F21S 41/141; F21S 41/16; G01S 17/86; G01S 17/894; G01S 17/931; G01S 2013/93277
  See application file for complete search history.

(56) References Cited

U.S. PATENT DOCUMENTS

| | | |
|---|---|---|
| 10,317,032 B2 | 6/2019 | Bhakta et al. |
| 2017/0176338 A1* | 6/2017 | Wu .................... G02B 21/367 |
| 2017/0248837 A1* | 8/2017 | Sato .................... G02B 26/008 |
| 2017/0357000 A1 | 12/2017 | Bartlett et al. |
| 2020/0191962 A1 | 6/2020 | Farris |
| 2020/0209398 A1 | 7/2020 | Kempf et al. |

OTHER PUBLICATIONS

Fenske et al., "DLP@ DMD Technology: LIDAR Ambient Light Reduction," DLPA093 White Paper, Sep. 2018, 23 pages.

Lee, "Introduction to ±12 Degree Orthogonal Digital Mircomirror Devices (DMDs)," DLPA008B, Feb. 2018, 13 pages.

* cited by examiner

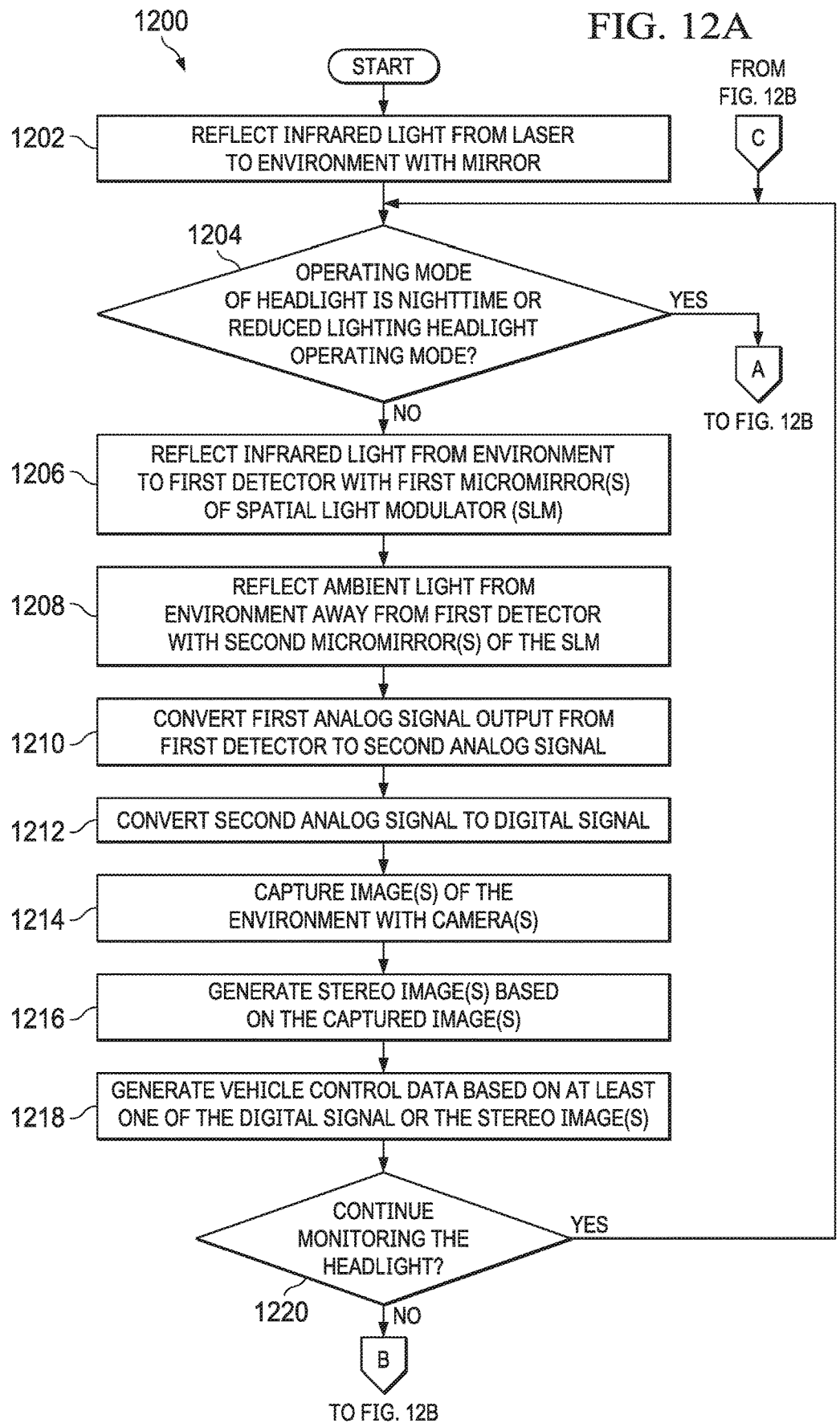

11,524,625 B2

ADAPTIVE VEHICLE HEADLIGHT

RELATED APPLICATION

This patent arises from an application claiming the benefit of U.S. Provisional Patent Application No. 62/947,199, which was filed on Dec. 12, 2019, which is hereby incorporated herein by reference in its entirety.

BACKGROUND

Vehicles are becoming increasingly complex as new electronic systems, such as autonomous driving and sensing technologies, become mainstream. Such electronic systems may include smart headlights and light detection and ranging (LIDAR) systems that may provide enhanced driving ability or improved safety for an operator of a vehicle. However, increasing the number and variety of electronic systems necessarily increases the cost and integration complexity of such vehicles, which may slow widespread adoption of such electronic systems.

BRIEF DESCRIPTION OF THE DRAWINGS

FIGS. 12A-12B illustrate a flowchart representative of an example system that may be executed to implement the adaptive headlights of FIGS. 1 and/or 2, the first example vehicle imaging system of FIGS. 3-4, and/or the second example vehicle imaging system of FIGS. 5-6 to facilitate vehicle control based on an operating mode of a headlight.

DETAILED DESCRIPTION

Figure 1:
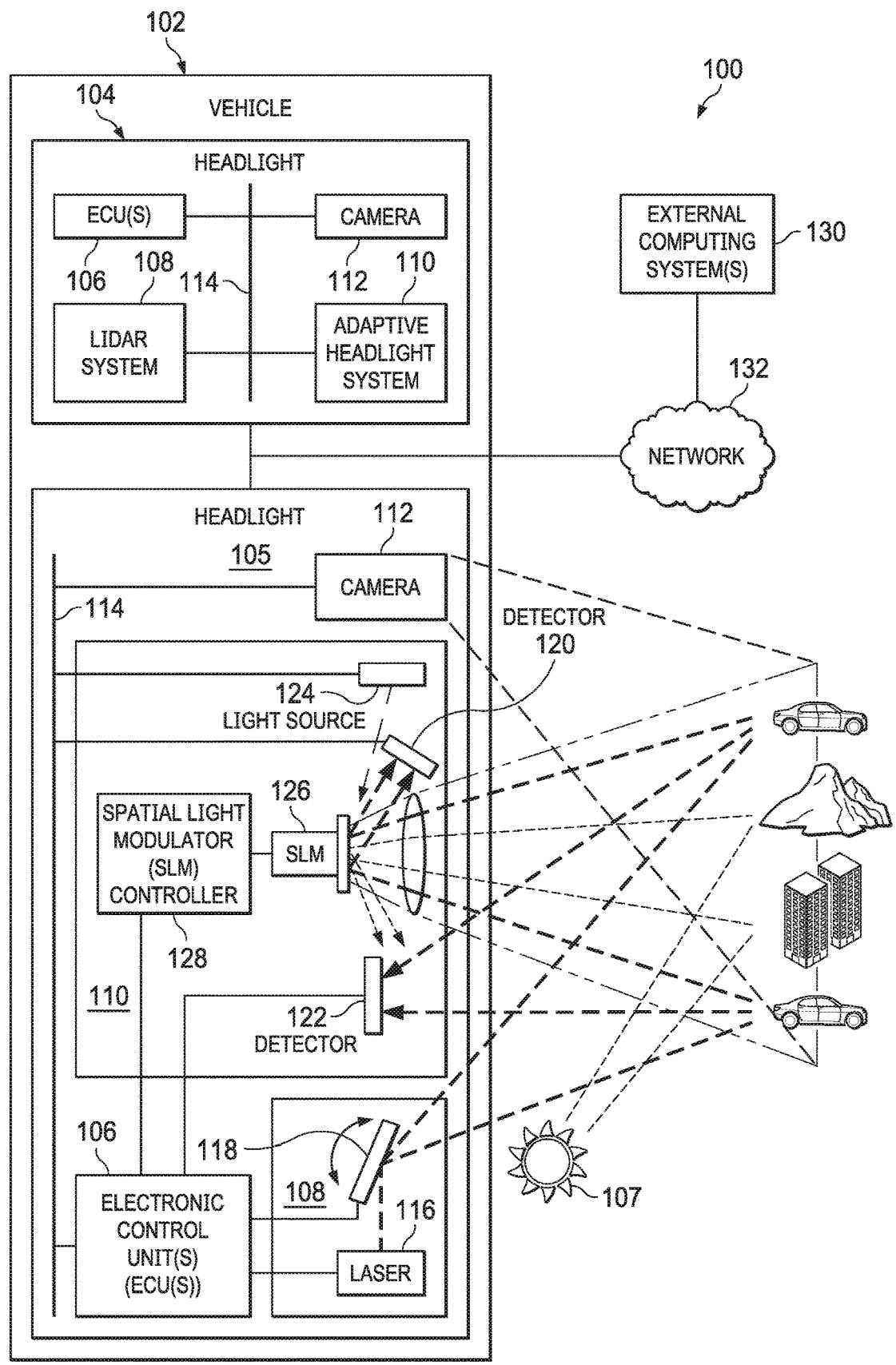
FIG. 1 is an illustration of an example vehicle including example adaptive headlights to facilitate control of the vehicle.

The figures are not to scale. Generally, the same reference numbers in the drawing(s) and this description refer to the same or like parts. Although the drawings show layers and regions with clean lines and boundaries, some or all of these lines and/or boundaries may be idealized. In reality, the boundaries and/or lines may be unobservable, blended and/or irregular.

Automotive vehicles (e.g., all-terrain vehicles (ATVs), industrial motor vehicles, sedans, sport utility vehicles (SUVs), trucks, vans, etc.), such as internal combustion engine vehicles, hybrid-electric vehicles (HEVs), electric vehicles (EVs), etc., may benefit from including adaptive headlights and/or light detection and ranging (LIDAR) systems to assist an operator to control the automotive vehicles and/or effectuate autonomous driving of such automotive vehicles. For example, an adaptive headlight may adjust its brightness in response to changing driving conditions. In other instances, a LIDAR system may be used to identify an object, determine a distance between the vehicle and the object (e.g., a building, a pedestrian, a vehicle, etc.), and invoke an assisted or autonomous driving action based on the identification and the distance or communicate the same to the driver.

A vehicle may include adaptive headlights and a LIDAR system to improve safety in connection with driving the vehicle. However, including both of these systems in the vehicle may be relatively expensive and may prohibit widespread adoption in some vehicle markets (e.g., compact vehicles or baseline vehicle models).

Examples described herein include adaptive headlights that share functionality with LIDAR systems to reduce a cost and electronic integration complexity of a vehicle and improve the operation of the vehicle. In some described examples, a spatial light modulator is shared between the headlight and LIDAR systems based on changing driving conditions. For example, the adaptive headlights may use the spatial light modulator to project light or adaptive light patterns on a road surface during nighttime or in otherwise reduced lighting conditions. In other examples, when the adaptive headlights are not utilized, the spatial light modular may be used by other optical systems and/or optical paths.

In some described examples, the LIDAR system may use the spatial light modulator to filter out ambient light from a photodetector during daytime or in otherwise increased lighting conditions. In such described examples, the LIDAR system may remain active during nighttime by using an auxiliary photodetector without an ambient light filtering system, which may not be needed during nighttime. Advantageously, examples described herein include the spatial light modulator to be re-configured to effectuate different optical functions based on a time of day or other condition (e.g., an environmental condition, a vehicle condition, etc.) of interest. In some described examples, a dichroic element may be used to optically multiplex the spatial light modulator between the different optical functions.

As used herein, connection references (e.g., attached, coupled, adapted to be coupled, connected, joined, among others) are to be construed in light of the specification and, when pertinent, the surrounding claim language. Construction of connection references in the present application shall be consistent with the claim language and the context of the specification which describes the purpose for which various elements are connected. As such, connection references do not necessarily infer that two elements are directly connected and in fixed relation to each other.

FIG. 1 is an illustration of a first example environment 100 including an example vehicle 102. For example, the first environment 100 may include a scene to be analyzed or processed by the vehicle 102 or system(s) thereof during daytime or in otherwise increased light conditions. The first environment 100 may include animals, buildings, pedestrians, vehicles, aspects of nature (e.g., a hill, a mountain, a tree, etc.), etc., and/or a combination thereof.

The vehicle 102 is an automobile. For example, the vehicle 102 may be an ICE vehicle, an HEV vehicle, an EV vehicle, etc. The vehicle 102 includes a first example headlight 104 and a second example headlight 105. The headlights 104, 105 are adaptive headlights, which may adjust their operation based on a condition of interest. For example, the condition may be a time condition (e.g., a timestamp, a time of day, etc.), an environmental condition (e.g., the sun 107 is out and thereby constitutes a daytime condition, the sun 107 is covered by clouds and thereby constitutes a reduced lighting condition, the sun 107 is out and thereby constitutes a nighttime or the reduced lighting condition, etc.), a presence of a detected obstacle, a position of a steering wheel of the vehicle 102, an activation of a turn signal (e.g., a status of a turn signal indicates that the turn signal is active) of the vehicle 102, an input from an operator of the vehicle 102, etc., and/or a combination thereof.

The headlights 104, 105 include example electronic control unit(s) (ECU(s)) 106, an example LIDAR system 108, an example adaptive headlight system 110, an example camera 112, and an example bus 114. The ECU(s) 106 is/are hardware that may control different function(s), operation(s), etc., of the vehicle 102. For example, the vehicle 102 may include a first one of the ECU(s) 106 that may control an engine and/or electric motor of the vehicle 102, a second one of the ECU(s) 106 that may control a transmission of the vehicle 102, etc. In this example, the ECU(s) 106 may control the LIDAR system 108, the adaptive headlight system 110, and/or the camera 112.

In some examples, the ECU(s) 106 determine an operating mode of the second headlight 105, and/or, more generally, the vehicle 102. For example, the ECU(s) 106 may determine that second headlight 105 is to operate in a daytime operating mode (e.g., a daytime headlight operating mode) or a nighttime operating mode (e.g., a nighttime headlight operating mode). In such examples, the ECU(s) 106 may generate and transmit command(s) to the SLM controller 128 to operate the SLM 126 in the daytime operating mode or the nighttime operating mode. Additionally or alternatively, the SLM controller 128 may determine that the second headlight 105 is to operate in the daytime operating mode or the nighttime operating mode The LIDAR system 108 is a scanning LIDAR system. The LIDAR system 108 effectuates machine vision operations, such as perceiving the first environment 100 or portion(s) thereof, identifying and/or otherwise identifying objects in the first environment 100, etc. In this example, the LIDAR system 108 scans transmitted light across a field of view of the first environment 100. The LIDAR system 108 includes an example laser 116, an example mirror (e.g., a laser mirror, a rotatable mirror, etc.) 118, a first example detector 120, and a second example detector 122. The laser 116 may be implemented with an infrared (IR) laser. Alternatively, any other laser type may be used. The mirror 118 may be implemented with a MEMS mirror, galvo, or optical phase array. Alternatively, any other mirror type may be used. The first detector 120 and/or the second detector 122 are photodetectors. For example, the first detector 120 and/or the second detector 122 may be implemented with an avalanche photodiode. Alternatively, the first detector 120 and/or the second detector 122 may be implemented using a Silicon Photomultiplier (SiPM) or a Multi-Pixel Photon Counter (MPPC).

The first detector 120 and/or the second detector 122 may remain stationary, while at the same time is/are able to detect and/or receive light from any direction that the LIDAR system 108 transmits light. In such examples, the first detector 120 and/or the second detector 122 may become blinded or saturated by ambient light or other light sources because the first detector 120 and/or the second detector 122 is/are able to receive light from a wide field of view. Advantageously, as described herein, optical path(s) of the headlights 104, 105 may be configured to mitigate, reduce, and/or otherwise eliminate such shortcomings in connection with one(s) of the detectors 120, 122.

In this example, the adaptive headlight system 110 includes the first detector 120, the second detector 122, an example light source 124, the SLM 126, and the SLM controller 128. Additionally or alternatively, the adaptive headlight system 110 may include fewer or more components. The light source 124 may be an illumination source implemented by one or more light-emitting diodes (LEDs) (e.g., one or more white LEDs, one or more color LEDs, etc., and/or a combination thereof). In some examples, the light source 124 may be a non-LED light or illumination source (e.g., a gas discharge lamp such as a Xenon bulb, a compact fluorescent lamp (CFL), a halogen lamp, etc.). In some examples, the light source 124 may be turned on during the day or daytime while the vehicle 102 is traveling through a construction zone, during the night or nighttime, etc.

The headlights 104, 105 include the camera 112 to capture two-dimensional (2-D) data to support the generation of three-dimensional (3-D) data (e.g., three-dimensional data, 3-D distance or measurement data, etc.) associated with objects of the first environment 100, and/or, more generally, of the first environment 100. For example, the ECU(s) 106 may use the 3-D data to determine a distance of an object and determine whether to execute an assisted or autonomous driving function, such as adjust a speed of the vehicle 102, adjust a position of a steering wheel of the vehicle 102, etc.

In some examples, the camera 112 supports the generation of 3-D data based on a first image (or first video) captured by a first one of the cameras 112 in the first headlight 104 and a second image (or second video) captured by a second one of the cameras 112 in the second headlight 105. For example, the cameras 112 in the first headlight 104 and the second headlight 105 may each generate 2-D data, which, when combined and/or otherwise processed in combination with each other by the ECU(s) 106 (or by different processor(s) and/or hardware), may be used to generate stereo images (or stereo video). In such examples, the cameras 112 may support the generation of stereo images (or stereo video) during daytime operation of the headlights 104, 105.

In some examples, the ECU(s) 106 generates 3-D data based on 2-D data generated by the camera 112. In such examples, the ECU(s) 106 may generate 3-D data based on light patterns (e.g., structured light patterns) captured by the camera 112 during nighttime operation of the headlights 104, 105. For example, the light source 124 may emit light that may be used to illuminate a structured light pattern on an object in the first environment 100. Structured light may correspond to a technique of projecting a known pattern onto a scene, an object in the scene, etc. In such examples, the ECU(s) 106 may generate the 3-D data by calculating depth and/or surface information of the object in the scene based on a deformation of the known pattern when the known pattern strikes a surface of the object. In some examples, the known pattern may be implemented by a grid, vertical bars, horizontal bars, etc.

The headlights 104, 105 include an example spatial light modulator (SLM) 126 and an example SLM controller 128. The SLM 126 may impose some form of spatially varying modulation on a beam of light (e.g., light from the light source 124, a reflected beam of the laser 116 from the first environment 100, etc.). In this example, the SLM 126 is a digital SLM. For example, the SLM 126 may be an electrical input, optical output micro-electrical-mechanical system (MEMS) or micro-opto-electromechanical system (MO-EMS) implemented with an array of highly reflective micromirrors (e.g., aluminum micromirrors or micromirrors implemented with any other type of reflective material) to effectuate high-speed, efficient, and reliable spatial light modulation (e.g., reflective phase modulation) with individually addressable pixels.

In some examples, the SLM 126 is implemented with an array of millions (e.g., 5 million, 8 million, 12 million, etc.) of individually controlled elements, such as micromirrors, built on top of an associated complimentary metal-oxide-semiconductor (CMOS) memory cell. For example, the SLM controller 128 may individually control one(s) of the millions of micromirrors. The SLM controller 128 may load each underlying CMOS memory cell with a '1' or a '0'. The SLM controller 128 may apply a mirror reset pulse, which causes each of the micromirrors to be electrostatically deflected about a hinge to an associated+/−degree state. For example, the SLM controller 128 may adjust a horizontal and/or vertical tilt of one(s) of the micromirrors.

In some examples, the +degree state corresponds to an 'on' pixel and the '-' degree state corresponds to an 'off' pixel. In some examples, the micromirrors of the SLM 126 may have +/−12 degree states, +/−17 degree states, etc. Alternatively, one(s) of the micromirrors may have any other+/−degree state. In some examples, the SLM controller 128 controls the SLM 126 to generate grayscale patterns by programming the on/off duty cycle of one(s) of the micromirrors. In some examples, the SLM controller 128 controls the SLM 126 to generate full red-green-blue (RGB) color images by multiplexing multiple light sources (e.g., multiple ones of the light source 124). In some examples, the SLM 126 is implemented with a digital micromirror device (DMD), by Texas Instruments®.

In some examples, the SLM 126 and/or the SLM controller 128 implement portion(s) of the LIDAR system 108 and/or the adaptive headlight system 110. For example, the light source 124 may be turned off during daytime operation. In such examples, the SLM controller 128 may control the SLM 126 to receive the reflected beams from the laser 116 and reflect the received beams to the first detector 120. In other examples, the light source 124 may be turned on during nighttime operation. In such examples, the SLM controller 128 may control the SLM 126 to reflect light from the light source 124 to the first environment 100 for nighttime visibility while driving the vehicle 102. In some such examples, the second detector 122 may receive the reflected beams from the laser 116 while the first detector 120 is disabled and/or otherwise not in use during nighttime operation.

In another example, the SLM 126 is a Liquid-Crystal-on-Silicon (LCoS) hardware (e.g., an LCoS projector, an LCoS display, an LCoS device, etc.). The LCoS hardware may be implemented as a reflective active-matrix liquid-crystal display (e.g., a microdisplay) that uses a liquid crystal layer on top of a silicon backplane. In some examples, an LCoS device may reflect light from the light source 124 to a lens or prism that collects and/or otherwise aggregates the light and displays an image based on the collected light. For example, the SLM controller 128 may control the voltage on reflective electrodes (e.g., square reflective electrodes, aluminum electrodes or reflective electrodes, etc.) beneath the liquid crystal layer. In some examples, each of the reflective electrodes may control one light pixel.

In some examples, the LCoS hardware may use a plurality of elements, such as liquid crystals, to control the amount of reflected light from the light source 124 to the lens or prism. For example, the LCoS device may control first elements, or a first set of liquid crystals, to reflect first light from the light source 124 to the first environment 100. In such examples, the LCoS device may control second elements, or a second set of the liquid crystals, to not reflect the first light from the light source 124 to the first environment 100. In some examples, the liquid crystals are substances that are in a mesomorphic state (e.g., may not be either a liquid or a solid). In some examples, the liquid crystals may be implemented with ferroelectric liquid crystals (FLCs). In some examples, FLCs may align themselves at a fixed angle away from the normal into orderly rows. The FLCs may develop an electrical polarity when they come into contact with an electrical charge. Alternatively, the liquid crystals may be implemented with any other type of liquid crystal. In additional examples, the SLM 126 is another hardware and/or technology that has a sufficient pattern update rate (e.g., a pattern update rate of 50 microseconds (us), 100 us, etc.) to accommodate the tracking of the reflected beam of the laser 116.

In this example, the ECU(s) 106, the LIDAR system 108, the adaptive headlight system 110, and the camera 112 are in communication with one(s) of each other via the bus 114. For example, the ECU(s) 106, the camera 112, the laser 116, the mirror 118, the first detector 120, the second detector 122, the light source 124, the SLM 126, and/or the SLM controller 128 may be in communication with one(s) of each other via the bus 114. In some examples, the bus 114 is representative of and/or otherwise is implemented by one or more interfaces (e.g., data interfaces, communication interfaces, etc.). For example, the bus 114 may be implemented by at least one of an Inter-Integrated Circuit (I2C) bus, a Serial Peripheral Interface (SPI) bus, a Peripheral Component Interconnect (PCI) bus, a camera serial interface (CSI), or an Ethernet interface. For example, a first interface between the camera 112 and the ECU(s) 106 may be implemented by a CSI. In such examples, a second interface between the ECU(s) 106 and the LIDAR system 108 may be implemented by Ethernet.

In this example, the ECU(s) 106, the headlights 104, 105, and/or, more generally, the vehicle 102, are in communication with example external computing system(s) 130 via an example network 132. The external computing system(s) 130 may be implemented with one or more computer servers, data facilities, cloud services, etc. The network 132 is the Internet. However, the network 132 may be implemented using any suitable wired and/or wireless network(s) including, for example, one or more data buses, one or more Local Area Networks (LANs), one or more wireless LANs, one or more cellular networks, one or more private networks, one or more public networks, etc. The network 132 enables the ECU(s) 106, the headlights 104, 105, and/or, more generally, the vehicle 102, to be in communication with the external computing system(s) 130.

By way of example, the network 132 may be a wired network. For example, the vehicle 102 may be brought to a vehicle service facility (e.g., a vehicle dealership, a vehicle repair shop, etc.). In such examples, the vehicle 102 may be connected to the external computing system(s) 130 via the network 132 with a wired connection (e.g., an Ethernet interface to implement a LAN connection). In some such examples, firmware and/or software of the ECU(s) 106, the SLM controller 128, etc., may be updated using firmware and/or software from the external computing system(s) 130. Alternatively, the vehicle 102 may be connected to the external computing system(s) 130 via the network 132 with a wireless connection to update the firmware and/or software of the ECU(s) 106, the SLM controller 128, etc., using firmware and/or software from the external computing system(s) 130.

Figure 2:
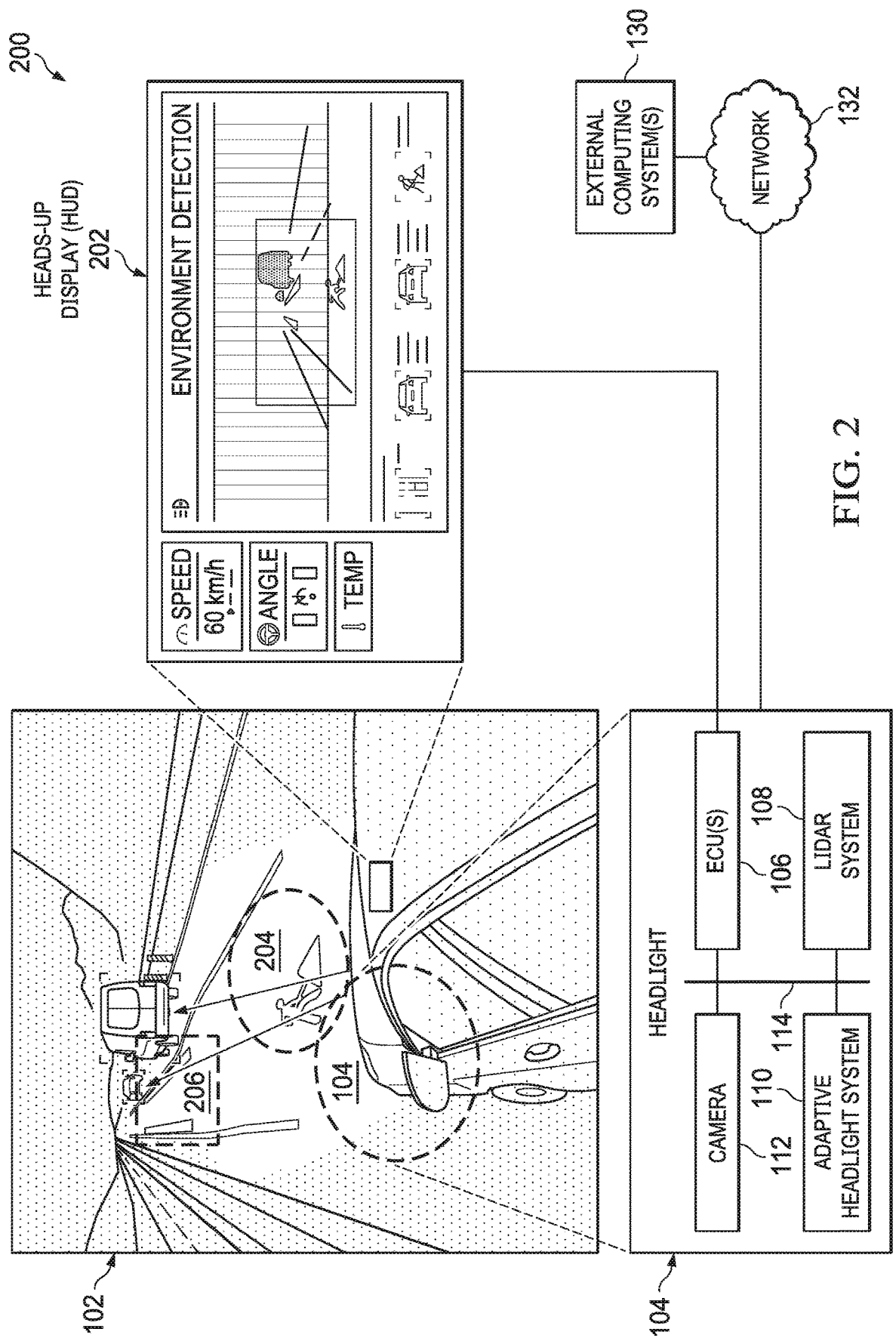
FIG. 2 is an illustration of the example vehicle of FIG. 1 including the example adaptive headlights of FIG. 1 and an example heads-up display to facilitate control of the vehicle.

FIG. 2 is an illustration of a second example environment 200 including the vehicle 102 of FIG. 1. For example, the second environment 200 may include a scene to be analyzed or processed by the vehicle 102 or system(s) thereof during nighttime or in otherwise reduced light conditions. The second environment 200 may include animals, buildings, pedestrians, reflective road markings and/or traffic signs, vehicles, aspects of nature (e.g., a hill, a mountain, a tree, etc.), etc., and/or a combination thereof.

The vehicle 102 includes the first headlight 104 of FIG. 1. In this example, the first headlight 104 projects example headlight patterns 204, 206 onto a road surface. In this example, the headlight patterns 204, 206 include a first example headlight pattern 204 and a second example headlight pattern 206. The first headlight pattern 204 includes a graphic representative of a construction worker. Advantageously, the first headlight 104 may project the first headlight pattern 204 onto the road surface to alert an operator of the vehicle 102 that the vehicle 102 is entering a construction zone or other safety zone. The second headlight pattern 206 includes graphics representative of enhanced road markings. Advantageously, the first headlight 104 may project the second headlight pattern 206 onto the road surface to alert the operator of changes in the road surface.

The vehicle 102 includes an example heads-up display (HUD) 202 to facilitate control of the vehicle 102. For example, the first headlight 104 may include the ECU(s) 106, the LIDAR system 108, the adaptive headlight system 110, the camera 112, and the bus 114 of FIG. 1. Further depicted in FIG. 2, the first headlight 104 is in communication with the external computing system(s) 130 via the network 132 of FIG. 1. Although not shown, the vehicle 102 includes the second headlight 105 of FIG. 1. The HUD 202 is a transparent display in a field-of-view of an operator of the vehicle 102. In such examples, the HUD 202 may be projected onto a portion of the front windshield of the vehicle 102. Alternatively, the HUD 202 may be displayed elsewhere in the vehicle 102.

The HUD 202 displays information of interest to an operator of the vehicle 102. For example, the HUD 202 may be configured to display environment conditions, such as a humidity level, a temperature, a wind speed, etc., or any other weather condition or information. The HUD 202 may be configured to display vehicle data (e.g., a speed of the vehicle 102, a fuel economy or power source range of the vehicle 102, etc.), an engine-related metric (e.g., a revolutions-per-minute (RPM) reading of an engine of the vehicle 102), an electric-motor metric (e.g., a current or voltage measurement, a torque, etc.), an electric vehicle metric (e.g., a battery or power source level), etc., and/or a combination thereof.

In some examples, the HUD 202 may be configured to display environment detection information. For example, the environment detection information may include a visual representation of the second environment 200 with enhanced clarity (e.g., a white/black representation, a nighttime mode display, etc.) during nighttime. In such examples, the visual representation may depict portion(s) of the second environment 200, such as the road surface, other vehicle(s) proximate the vehicle 102, reflective road markings, etc. For example, the LIDAR system 108 may detect the portion(s) of the second environment 200 and transmit the detected portion(s) to the ECU(s) 106. The ECU(s) 106 may generate environment detection information based on the detected portion(s) and transmit the environment detection information to the HUD 202 for display to an operator of the vehicle 102.

In some examples, the ECU(s) 106 may determine 3-D data from the 2-D data generated by the camera 112 by determining distortions (e.g., distortion measurements) of structured light patterns generated by the adaptive headlight system 110. In such examples, the camera 112 may transmit the 2-D data indicative of the distortions to the ECU(s) 106. The ECU(s) 106 may generate 3-D data based on the 2-D data. The ECU(s) 106 may determine environment detection information based on the 3-D data and transmit the environment detection information to the HUD 202 for presentation to an operator of the vehicle 102. Advantageously, examples described herein may re-use components of the first headlight 104, such as the SLM 126 and/or the SLM controller 128 of FIG. 1, to implement portion(s) of the LIDAR system 108 and the adaptive headlight system 110 during nighttime operation. Advantageously, examples described herein eliminate redundant LIDAR and/or adaptive headlight components, such as the SLM 126 and/or the SLM controller 128.

Figure 3:
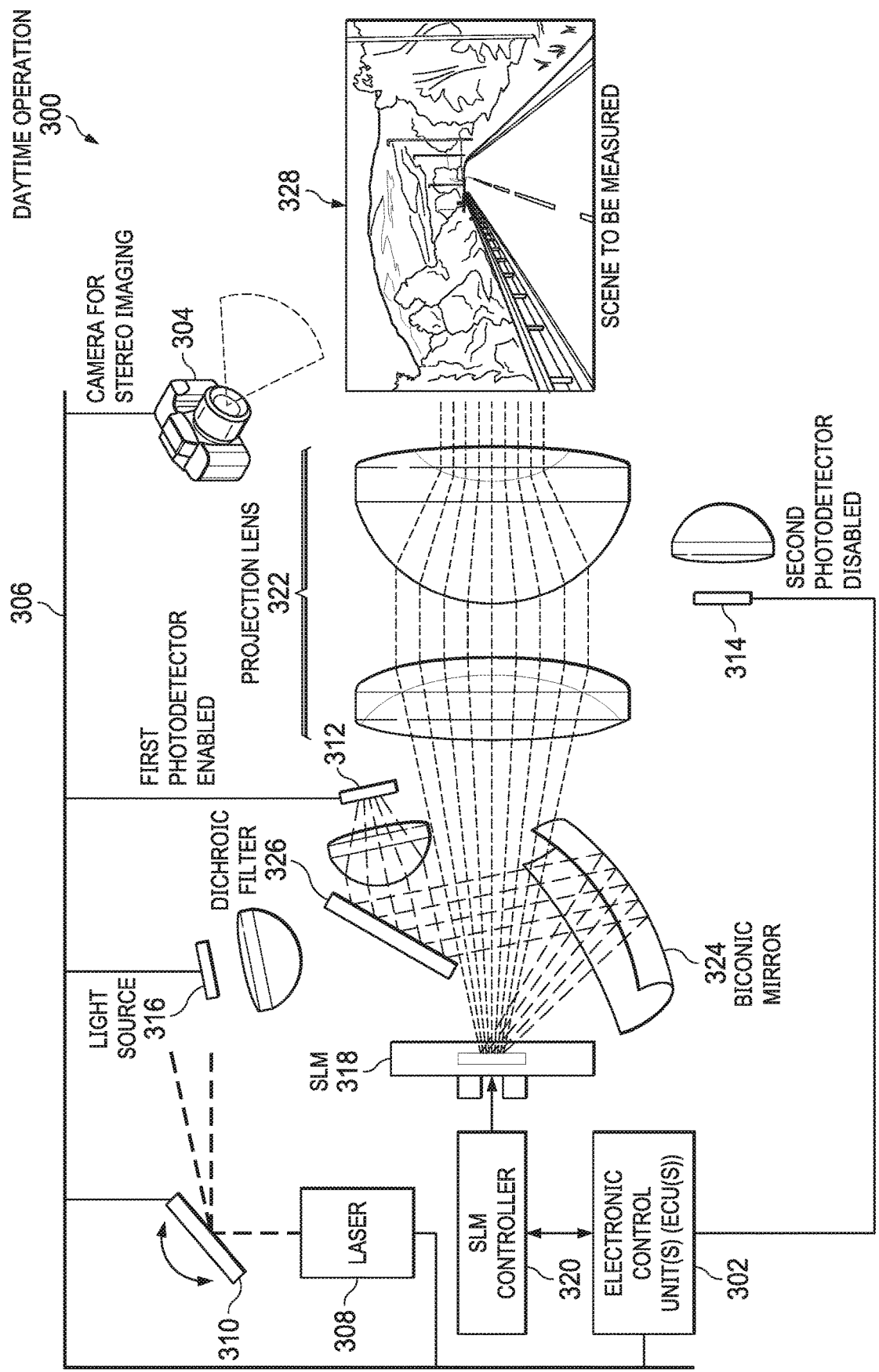
FIG. 3 is an illustration of a first example vehicle imaging system to facilitate control of the example vehicle of FIGS. 1 and/or 2 during daytime operation.

FIG. 3 is an illustration of a first example vehicle imaging system 300 to facilitate control of the vehicle 102 of FIGS. 1 and/or 2 during daytime operation. The first vehicle imaging system 300 includes example ECU(s) 302, an example camera 304, an example bus 306, an example laser 308, an example mirror (e.g., laser mirror) 310, a first example detector 312, a second example detector 314, an example light source 316, an example SLM 318, an example SLM controller 320, an example projection lens 322, an example biconic mirror 324, and an example dichroic filter 326, and an example scene 328. In some examples, respective one(s) of the ECU(s) 302, the camera 304, the bus 306, the laser 308, the mirror 310, the first detector 312, the second detector 314, the light source 316, the example SLM 318, and/or the example SLM controller 320 may implement respective one(s) of the ECU(s) 106, the camera 112, the bus 114, the laser 116, the mirror 118, the first detector 120, the second detector 122, the light source 124, the SLM 126, and/or the SLM controller 128 of FIG. 1. In some examples, an instance of the first vehicle imaging system 300 may implement the first headlight 104 or the second headlight 105 of FIG. 1.

In example operation, the ECU(s) 302 enable and/or otherwise turn on the laser 308 to scan an example scene 328. The ECU(s) 302 may control a position, a rotation, etc., of the mirror 310 to adjust portion(s) of the scene 328 to be measured, scanned, and/or otherwise analyzed. The ECU(s) 302 may determine that the scene 328 is indicative of daytime. For example, the ECU(s) 302 may determine that the scene 328 is an environment during the daytime based on time data (e.g., a timestamp, a time of day, etc.), environmental data (e.g., a measurement from a light sensor of the vehicle 102, data from an Internet-facilitated weather service, etc.), user control data (e.g., an operator of the vehicle 102 activates a daytime operation switch, configuration, setting, etc.), etc., and/or a combination thereof. In such examples, the ECU(s) 302 may turn off and/or otherwise disable an illumination source, such as the light source 316, which may not be needed during daytime operation.

In example operation, the ECU(s) 302 may generate and transmit command(s) to the SLM controller 320 to operate the first vehicle imaging system 300 in a daytime operating mode (e.g., a daytime headlight operating mode). The SLM controller 320 may determine that the scene 328 is an environment during the daytime based on the command(s) from the ECU(s) 302. The SLM controller 320 may control the SLM 318 to reject ambient light from the scene 328 to improve operation of the LIDAR system 108 of FIG. 1, which includes the laser 308 and the mirror 310. For example, the SLM controller 320 may adjust an optical path associated with the first vehicle imaging system 300 by configuring a degree state of one(s) of the micromirrors of the SLM 318 to reject and/or otherwise reduce ambient light.

In example operation, the SLM controller 320 may control the SLM 318 to receive infrared light through the projection lens that is transmitted by the laser 308 and reflected from the scene 328. For example, the SLM controller 320 may control first one(s) of the micromirrors (e.g., first one(s) of the elements) of the SLM 318 to reflect and/or otherwise steer the infrared light received via the projection lens 322 to the biconic mirror 324, which reflects and/or otherwise steers the infrared light to the dichroic filter 326 and ultimately to the first detector 312. The SLM controller 320 may control second one(s) of the micromirrors (e.g., second one(s) of the elements) of the SLM 318 to reflect non-infrared light (e.g., ambient light) away from the biconic mirror 324. For example, the SLM controller 320 may determine that the second one(s) of the micromirrors are likely to reflect the non-infrared light based on a position of the mirror 310. In such examples, the SLM controller 320 may determine to control the position(s) of the second one(s) of the micromirrors to reflect the non-infrared light away from the biconic mirror 324.

The biconic mirror 324 is a physical material having a curved surface (e.g., a spherical curved surface, an aspheric curved surface, etc.) that has two different radii to reduce and/or otherwise eliminate vectorial aberrations from the reflected infrared light. The dichroic filter 326 is a physical thin-film or interference filter that is configured to selectively pass light of a small range of colors (or light) while reflecting other colors. For example, the dichroic filter 326 may be implemented with a physical material having a thin film configured to reflect infrared light towards the first detector 312 while reflecting non-infrared light away from the first detector 312.

In example operation, the first detector 312 detects the portion(s) of the scene 328 and transmits the detected portion(s) to the ECU(s) 302. The ECU(s) 302 may generate environment detection information based on the detected portion(s) and transmit the environment detection information to the HUD 202 of FIG. 2 for display to an operator of the vehicle 102 and/or for further processing. In example operation, the ECU(s) 302 ignore and/or otherwise drop data from the second detector 314 because the second detector 314 may be saturated with ambient light. Advantageously, the SLM controller 320 may utilize the SLM 318 to improve operation of the LIDAR system 108 of FIG. 1 during daytime operation by reducing electrical noise associated with the first detector 312 receiving ambient light from the scene 328.

In example operation, the camera 304 may capture an image, sequential images (e.g., video), etc., of the scene 328 to generate 2-D data, which may be used to generate 3-D data. For example, the camera 304 of the first headlight 104 may transmit a first image at a first time to a first one of the ECU(s) 302 and the camera 304 of the second headlight 105 may transmit a second image at substantially the first time to a second one of the ECU(s) 302. In such examples, the ECU(s) 302 may generate 3-D data, such as a distance of an object in the scene 328, by creating a stereo image based on the first and second images. In some examples, the camera 304 of the first headlight 104 and the camera 304 of the second headlight 105 may transmit the first and second images to the same one of the ECU(s) 302 to cause the generation of the 3-D data.

Figure 4:
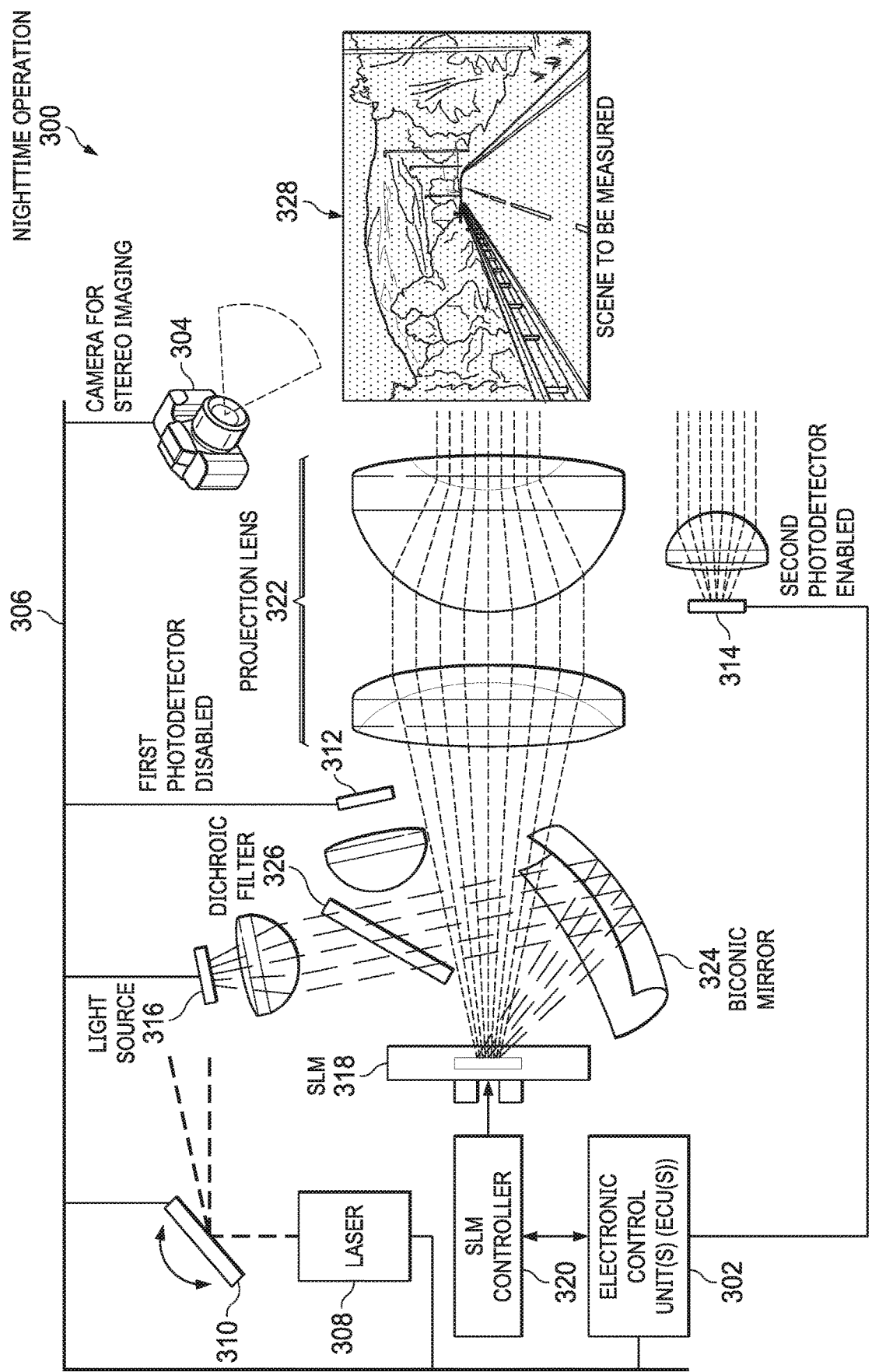
FIG. 4 is an illustration of the first example vehicle imaging system of FIG. 3 to facilitate control of the example vehicle of FIGS. 1 and/or 2 during nighttime operation.

FIG. 4 is an illustration of the first vehicle imaging system 300 of FIG. 3 to facilitate control of the vehicle 102 of FIGS. 1 and/or 2 during nighttime operation. In example operation, the ECU(s) 302 enable and/or otherwise turn on the laser 308 to scan the scene 328 of FIG. 3. The ECU(s) 302 may determine that the scene 328 is indicative of nighttime. For example, the ECU(s) 302 may determine that the scene 328 is an environment during the nighttime based on a timestamp (e.g., a time of day), a measurement from a light sensor of the vehicle 102, etc. In such examples, the ECU(s) 302 may turn on and/or otherwise enable an illumination source, such as the light source 316, which may be needed during nighttime operation. The light source 316, when enabled, may illuminate the biconic mirror 324, which reflects and/or otherwise steers the illumination to the SLM 318.

In example operation, the ECU(s) 302 may generate and transmit command(s) to the SLM controller 320 to operate the first vehicle imaging system 300 in a nighttime operating mode (e.g., a nighttime headlight operating mode). The SLM controller 320 may determine that the scene 328 is an environment during the nighttime based on the command(s) from the ECU(s) 302.

In example operation, the SLM controller 320 may control the SLM 318 to reflect light from the light source 316 onto the scene 328 to improve nighttime visibility for an operator of the vehicle 102. For example, the SLM controller 320 may adjust an optical path associated with the first vehicle imaging system 300 by configuring a degree state of one(s) of the micromirrors of the SLM 318 to reflect light from the light source 316 onto the scene 328 through the projection lens. For example, the SLM controller 320 may control first one(s) of the micromirrors of the SLM 318 to reflect light from the light source 316 through the projection lens 322. The SLM controller 320 may control second one(s) of the micromirrors of the SLM 318 to reflect the light from the light source 316 away from the projection lens 322. For example, the SLM controller 320 may obtain a command from the ECU(s) 302 to cause the projection of light based on a structured light pattern. In such examples, the SLM controller 320 may determine positions of the first one(s) and the second one(s) of the micromirrors to generate the structured light pattern of the projected light. Advantageously, the SLM controller 320 may project a known light pattern onto the scene 328 to support the determination of 3-D data associated with the scene 328 or portion(s) thereof based on a measured distortion of the known light pattern, which may be captured by the camera 304.

In example operation, the first vehicle imaging system 300 may operate the LIDAR system 108 of FIG. 1 by receiving infrared light from the laser 308 that is reflected off of portion(s) of the scene 328 with the second detector 314. In example operation, the second detector 314 detects the portion(s) of the scene 328 and transmits the detected portion(s) to the ECU(s) 302. The ECU(s) 302 may generate environment detection information based on the detected portion(s) and transmit the environment detection information to the HUD 202 of FIG. 2 for display to an operator of the vehicle 102 and/or for further processing. In example operation, the ECU(s) 302 ignore and/or otherwise drop data from the first detector 312 because the first detector 312 may be saturated with light from the light source 316. Advantageously, the SLM controller 320 may utilize the SLM 318 to improve operation of the adaptive headlight system 110 of FIG. 1 and/or the LIDAR system 108 of FIG. 1 during nighttime operation by improving nighttime visibility for an operator of the vehicle 102 while supporting detection functions of the LIDAR system 108.

In example operation, the camera 304 may capture an image, sequential images (e.g., video), etc., of the scene 328 to generate 2-D data. For example, the SLM 318 may be controlled to project a known light pattern onto the scene 328. The camera 304 may capture a first image of the known light pattern at a first time, a second image at a second time after the first time, etc., and transmit the images to the ECU(s) 302. The ECU(s) 302 may generate 3-D data, such as a distance of an object in the scene 328, by measuring a distortion of the known light pattern indicated by the 2-D data based on one or more of the images captured by the camera 304.

Figure 5:
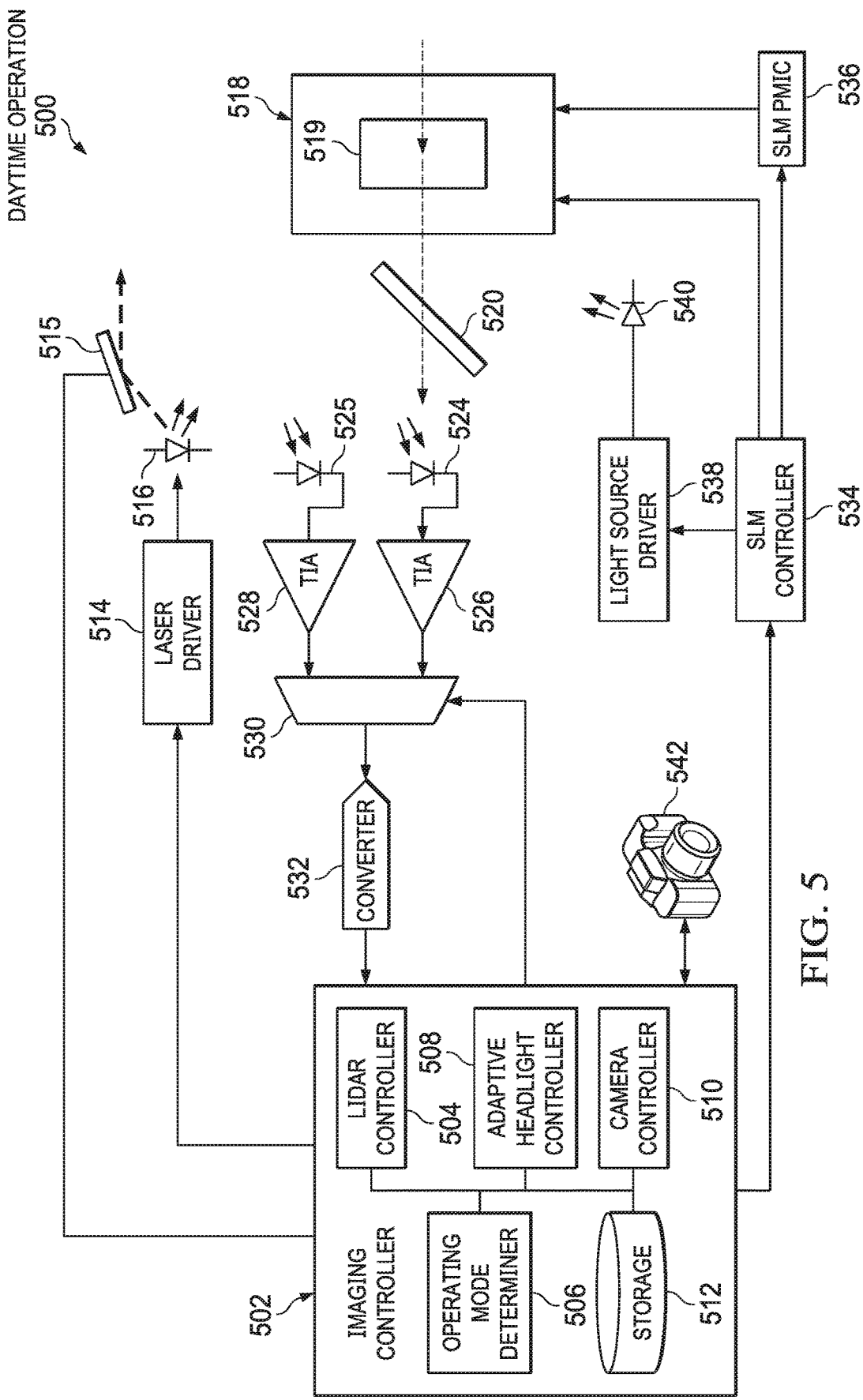
FIG. 5 is an illustration of a second example vehicle imaging system to facilitate control of the example vehicle of FIGS. 1 and/or 2 during daytime operation.

FIG. 5 is an illustration of a second example vehicle imaging system 500 to facilitate control of the vehicle 102 of FIGS. 1 and/or 2 during daytime operation. In some examples, the second vehicle imaging system 500 implements the first headlight 104 of FIG. 1, the second headlight 105 of FIG. 1, and/or the first vehicle imaging system 300 of FIGS. 3-4.

The second vehicle imaging system 500 includes an example imaging controller 502, which includes and/or otherwise implements an example LIDAR controller 504, an example operating mode determiner 506, an example adaptive headlight controller 508, an example camera controller 510, and example storage 512. In some examples, the imaging controller 502 implements the ECU(s) 106 of FIGS. 1-4 or portion(s) thereof.

The second vehicle imaging system 500 includes an example laser driver 514, an example laser mirror 515, an example laser 516, an example SLM 518, which includes and/or otherwise implements an example micromirror array 519, an example dichroic filter 520, a first example detector 524, a second example detector 525, a first example transimpedance amplifier (TIA) 526, a second example TIA 528, an example multiplexer 530, an example converter 532, an example SLM controller 534, an example SLM power management integrated circuit (PMIC) 536, an example light source driver 538, an example illumination source 540, and an example camera 542.

Output terminal(s) of the imaging controller 502 is/are coupled to an input terminal of the laser driver 514. Output terminal(s) of the laser driver 514 is/are coupled to an input terminal of the laser 516. The laser driver 514 is a power supply. For example, the laser driver 514 may be implemented by a driver (e.g., a current driver, a gate driver, etc.) that drives a field-effect transistor (FET) (e.g., a gallium nitride FET, a silicon FET, etc.) to provide a current to the laser 516. The laser 516 is a diode. For example, the laser 516 may be implemented with a laser diode, an injection laser diode, a diode laser, etc., which, when pumped directly with electrical current, may create lasing conditions at the diode's junction. In some examples, the laser driver 514 and/or the laser 516 implement(s) an IR laser. In some examples, the laser driver 514, the laser mirror 515, and/or the laser 516 implement(s) the LIDAR system 108 of FIGS. 1-2, the laser 116 of FIGS. 1-4, or portion(s) thereof. In this example, the laser 516 is in optical communication (e.g., optically coupled) to the laser mirror 515.

Input terminal(s) of one(s) of the micromirror(s) of the micromirror array, 519 and/or, more generally, the SLM 518 is/are coupled to output terminal(s) of the SLM controller 534 and output terminal(s) of the SLM PMIC 536. In some examples, the micromirror array 519, and/or, more generally, the SLM 518 implement the SLM 126 of FIG. 1 and/or the SLM 318 of FIGS. 3-4. The micromirror array 519 may be implemented by an array of highly reflective micromirrors (e.g., aluminum micromirrors or micromirrors implemented with any other type of reflective material) to effectuate high-speed, efficient, and reliable spatial light modulation (e.g., reflective phase modulation) with individually addressable pixels.

Output terminal(s) (e.g., controller output terminal(s)) of the SLM controller 534 is/are coupled to input terminal(s) of the SLM PMIC 536 and input terminal(s) (e.g., light source driver input terminal(s)) of the light source 538. Output terminal(s) (e.g., light source driver output terminal(s)) of the light source 538 is/are coupled to input terminal(s) (e.g., light source terminal(s)) of the light source 540. Input terminal(s) (e.g., controller input terminal(s)) of the SLM controller 534 is/are coupled to output terminal(s) of the imaging controller 502.

The SLM PMIC 536 is a power supply that may be implemented by a power integrated circuit (IC). For example, the SLM PMIC 536 may be implemented with a high-voltage regulator that generates control voltage(s) for one(s) of the micromirror array 519. In such examples, the SLM PMIC 536 may generate a first control voltage of −10 V direct current (DC), a second control voltage of +8.5 V DC, a third control voltage of +16 V DC, etc.

In some examples, the SLM controller 534 may be implemented using hardware logic, machine readable instructions stored in a non-transitory computer readable storage medium, hardware implemented state machines, etc., and/or a combination thereof. For example, the SLM controller 534 may be implemented by one or more analog or digital circuit(s), logic circuits, programmable processor(s), programmable controller(s), application specific integrated circuit(s) (ASIC(s)), programmable logic device(s) (PLD(s)), and/or field programmable logic device(s) (FPLD(s)). In some examples, the SLM controller 534 implements the SLM controller 128 of FIG. 1 and/or the SLM controller 320 of FIGS. 3-4.

The light source driver 538 is a power supply. For example, the light source driver 538 may be implemented with a power regulator that regulates and supplies a desired current to an illumination source, such as the light source 540. The light source 540 is a white LED. Alternatively, the light source 540 may be any other type of LED. In some examples, the light source 540 implements the light source 124 of FIG. 1 and/or the light source 316 of FIGS. 3-4. Alternatively, the light source 540 may be implemented with a non-LED light or illumination source (e.g., a gas discharge lamp such as a Xenon bulb, a CFL, a halogen lamp, etc.).

The micromirror array 519, and/or, more generally, the SLM 518, is optically coupled with at least one of the dichroic filter 520, the first detector 524, or the light source 540. For example, first one(s) of micromirror(s) of the micromirror array 519 may be controlled by the SLM controller 534 to reflect light through the dichroic filter 520 to the first detector 524. In such examples, second one(s) of micromirror(s) of the micromirror array 519 may be controlled by the SLM controller 534 to reflect light away from the first detector 524. The first detector 524 is an avalanche photodiode. Alternatively, the first detector 524 may be an SiPM or a MPPC. In some examples, the first detector 524 implements the first detector 120 of FIG. 1 and/or the first detector 312 of FIGS. 3-4. Alternatively, the first detector 524 may implement the second detector 122 of FIG. 1 and/or the second detector 314 of FIGS. 3-4.

Output terminal(s) of the first detector 524 is/are coupled to input terminal(s) (e.g., amplifier input terminal(s), TIA input terminal(s), etc.) of the first TIA 526. The first TIA 526 may be implemented with one or more operational amplifiers to implement a current-to-voltage converter. Output terminal(s) (e.g., amplifier output terminal(s), TIA output terminal(s), etc.) of the first TIA 526 is/are coupled to input terminal(s) (e.g., multiplexer input terminal(s)) of the multiplexer 530. Output terminal(s) (e.g., multiplexer output terminal(s)) of the multiplexer 530 is/are coupled to input terminal(s) (e.g., converter input terminal(s)) of the converter 532. Output terminal(s) (e.g., converter output terminal(s)) of the converter 532 are coupled to input terminal(s) of the imaging controller 502. Output terminal(s) (e.g., controller output terminal(s)) of the imaging controller 502 are coupled to control or selection input terminal(s) (e.g., multiplexer control terminal(s), multiplexer selection terminal(s), etc.) of the multiplexer 530.

Output terminal(s) of the second detector 525 is/are coupled to input terminal(s) of the second TIA 528. Output terminal(s) of the second TIA 528 is/are coupled to input terminal(s) of the multiplexer 530. The second detector 525 is configured to detect light from an environment, such as the environments 100, 200 of FIGS. 1 and/or 2 and/or the scene 328 of FIG. 3. The second detector 525 is an avalanche photodiode. Alternatively, the second detector 525 may be an SiPM or a MPPC. In some examples, the second detector 525 implements the second detector 122 of FIG. 1 and/or the second detector 314 of FIGS. 3-4. Alternatively, the second detector 525 may implement the first detector 120 of FIG. 1 and/or the first detector 312 of FIGS. 3-4. The second TIA 528 may be implemented with one or more operational amplifiers to implement a current-to-voltage converter.

Terminal(s) (e.g., input terminal(s), output terminal(s), etc.) of the camera 542 is/are coupled to terminal(s) (e.g., input terminal(s), output terminal(s), etc.) of the imaging controller 502. In some examples, the camera 542 implements the camera 112 of FIGS. 1-4.

In this example, the imaging controller 502 includes the operating mode determiner 506 to determine a headlight operating mode based on at least one of time data, environmental data, or user control data. For example, the operating mode determiner 506 may determine whether the operating mode of the second vehicle imaging system 500 is to be a nighttime operating mode (e.g., a reduced lighting operating mode) or a daytime operating mode (e.g., an increased lighting operating mode). In such examples, the operating mode determiner 506 may determine whether the operating mode is a nighttime or daytime operating mode based on a timestamp, a measurement from a light sensor monitoring an environment, or a vehicle command from an operator of the vehicle 102 that includes the second vehicle imaging system 500. In some examples, the operating mode determiner 506 stores at least one of the operating mode, the time data, the environmental data, or the user control data in the storage 512.

The imaging controller 502 includes the LIDAR controller 504 to generate 3-D data associated with an object, an environment, etc., of interest. In some examples, the LIDAR controller 504 controls the laser driver 514 to cause the laser 516 to transmit light (e.g., IR light) to the object, the environment, etc., of interest. The LIDAR controller 504 may generate 3-D data associated with an object, such as a building, a vehicle, a pedestrian, an animal, etc., of the first environment 100 of FIG. 1, the scene 328 of FIGS. 3-4, etc., based on the digital signal(s) received from the converter 532. In example daytime operation, a reflection of the transmitted light may be received by the micromirror array 519, which is reflected through the dichroic filter 520 to the first detector 524.

The imaging controller 502 includes the adaptive headlight controller 508 to configure optical path(s) associated with a headlight based on an operating mode of the headlight. In some examples, the adaptive headlight controller 508 configures one or more optical paths associated with the headlight 104 of FIGS. 1-2 for the nighttime headlight operating mode, which is described below in connection with FIG. 6. In some examples, the adaptive headlight controller 508 configures one or more optical paths associated with the headlight 104 of FIGS. 1-2 for the daytime headlight operating mode. In such examples, the adaptive headlight controller 508 may transmit command(s) to the SLM controller 534 to adjust position(s) of one(s) of the micromirror array 519 to reflect light either towards to or away from the first detector 524. For example, the adaptive headlight controller 508 may adjust the position(s) to track and/or otherwise correspond to a field-of-view that the laser 516 is scanning and thereby be in position to receive the reflections of the laser 516 from the environment. In some examples, the adaptive headlight controller 508 stores position data (e.g., a +/−degree state of a first micromirror, a +/−degree state of a second micromirror, etc., of the micromirror array 519) associated with one(s) of the micromirror array 519 in the storage 512.

In example daytime operation, the LIDAR controller 504 may select an input of the multiplexer 530 that corresponds to the output terminal(s) of the first detector 524. The first TIA 526 converts a current output of the first detector 524 to a voltage and provides the voltage to the multiplexer 530. The multiplexer 530 may provide the voltage to the converter 532 for processing.

In some examples, the converter 532 is an analog-to-digital converter (ADC) that converts the voltage from the multiplexer 530 to a digital signal (e.g., a digital representation of the voltage) and provides the digital signal to the LIDAR controller 504, and/or, more generally, the imaging controller 502, to support the generation of the 3-D data. In some examples, the converter 532 is a time-to-digital converter (TDC) that converts the voltage from the multiplexer 530 to a digital signal (e.g., a digital representation of the time the voltage is generated) and provides the digital signal to the LIDAR controller 504, and/or, more generally, the imaging controller 502, to support the generation of the 3-D data. In some examples, the LIDAR controller 504 stores the digital signal(s) from the converter 532 and/or the 3-D data in the storage 512.

The imaging controller 502 includes the camera controller 510 to capture images of an object, an environment, etc., of interest. In example daytime operation, the camera controller 510 may instruct the camera 542 to take a first image of the environment. In some examples, the camera controller 510 may obtain a second image of the environment taken at substantially the same time as the first time from another instance of the camera 542 (e.g., a camera in a different headlight of the vehicle 102). The camera controller 510 may generate a stereo image or stereo image data based on the first image and the second image. In some examples, the camera controller 510 may instruct the different instance of the camera 542 to capture the second image substantially at the same time that the camera 542 of FIG. 5 captures the first image to support generation of the stereo image. Advantageously, the camera controller 510 may generate 3-D data associated with an object, an environment, etc., of interest during daytime operation based on images captured by one(s) of the camera 542 by generating stereo images.

The imaging controller 502 includes the storage 512 to record data. For example, the storage 512 may record 3-D data, micromirror position data, image data, stereo image data, an operating mode, time data, environmental data, user control data, etc., and/or a combination thereof. The storage 512 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., read-only memory (ROM), electrically erasable programmable read-only memory (EEPROM), flash memory, etc.). The storage 512 may additionally or alternatively be implemented by one or more double data rate (DDR) memories, such as DDR, DDR2, DDR3, DDR4, mobile DDR (mDDR), etc. The storage 512 may additionally or alternatively be implemented by one or more mass storage devices such as hard disk drive(s), compact disk drive(s), digital versatile disk drive(s), solid-state disk drive(s), etc. While in the illustrated example the storage 512 is illustrated as a single storage, the storage 512 may be implemented by any number and/or type(s) of storage. Furthermore, the data stored in the storage 512 may be in any data format such as, for example, binary data, comma delimited data, tab delimited data, structured query language (SQL) structures, etc.

Figure 6:
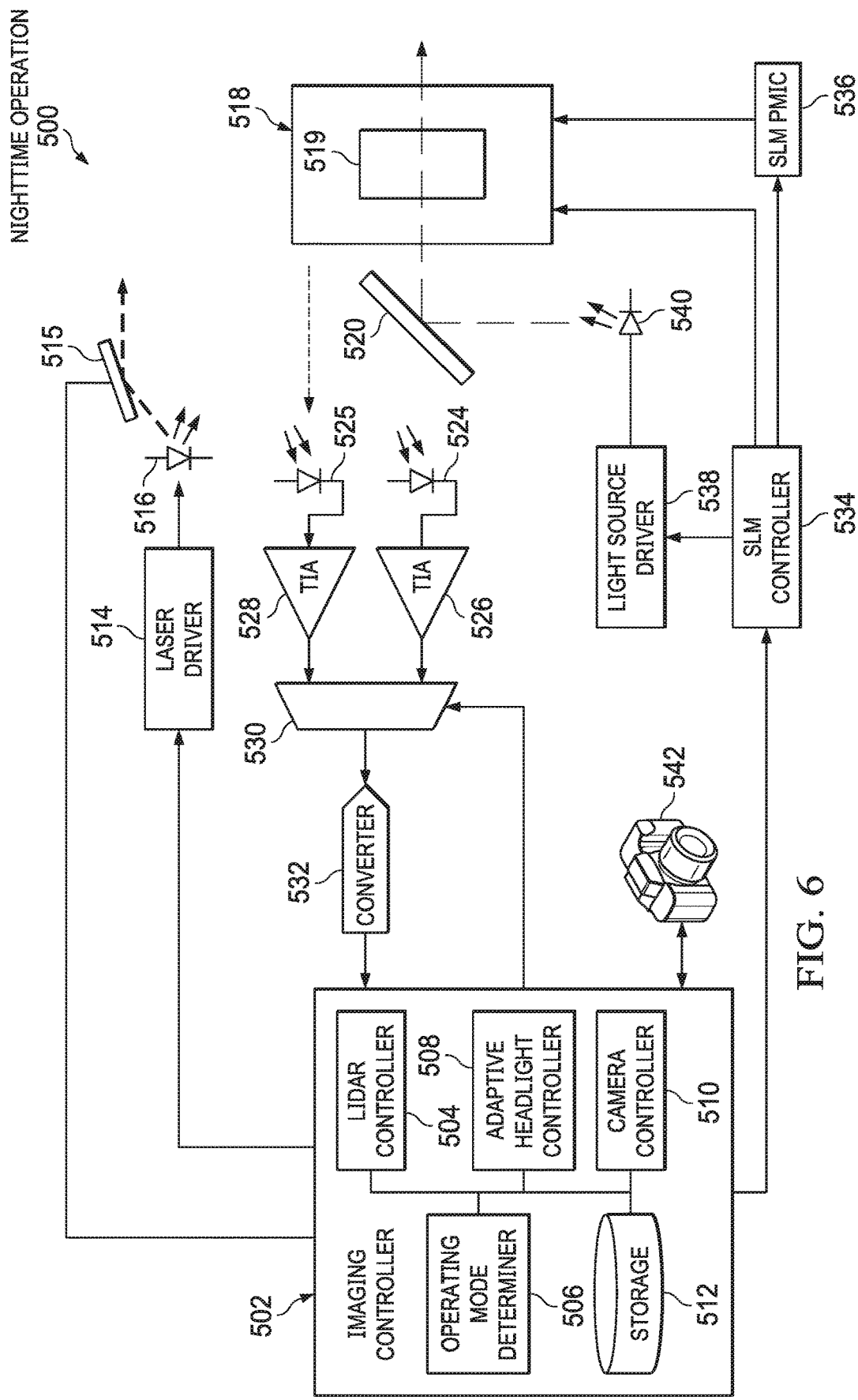
FIG. 6 is an illustration of the second example vehicle imaging system of FIG. 5 to facilitate control of the example vehicle of FIGS. 1 and/or 2 during nighttime operation.

FIG. 6 is an illustration of the second vehicle imaging system 500 of FIG. 5 to facilitate control of the vehicle 102 of FIGS. 1 and/or 2 during nighttime operation. In example nighttime operation, the LIDAR controller 504 invokes the laser driver 514 to turn on the laser 516 to scan an object, an environment, etc., of interest. In example nighttime operation, the operating mode determiner 506 may determine that the operating mode of the second vehicle imaging system 500 is to be a nighttime operating mode (e.g., a reduced lighting operating mode) based on a timestamp (e.g., a time of day indicating that it is nighttime or after dusk, sunset, etc.), a measurement from a light sensor monitoring an environment, or a vehicle command from an operator of the vehicle 102 that includes the second vehicle imaging system 500.

In some examples, the adaptive headlight controller 508 and/or the camera controller 510 may determine that the operating mode is the nighttime operating mode by receiving the indication of the operating mode from the operating mode determiner 506 or by retrieving the operating mode from the storage 512. Based on the nighttime operating mode, the adaptive headlight controller 508 may direct the SLM controller 534 to invoke the light source driver 538 to turn on the light source 540. Based on the nighttime operating mode, the adaptive headlight controller 508 may invoke the SLM controller 534 to adjust one(s) of the micromirror array 519 to project light from the light source 540 to the environment.

In example nighttime operation, the second detector 525 may receive and/or otherwise detect light reflected by the environment from the micromirror array 519. The LIDAR controller 504 may select an input of the multiplexer 530 that corresponds to the output terminal(s) of the second detector 525. The second TIA 528 may convert a current output of the second detector 525 to a voltage and provide the voltage to the multiplexer 530. The multiplexer 530 may provide the voltage to the converter 532 for processing.

The converter 532 may convert the voltage from the multiplexer 530 to a digital signal (e.g., a digital representation of the voltage, a time associated with the voltage, etc.) and provide the digital signal to the LIDAR controller 504, and/or, more generally, the imaging controller 502, to support the generation of the 3-D data. In example nighttime operation, the camera controller 510 directs the camera 542 to capture images of an object, an environment, etc., of interest. For example, the adaptive headlight controller 508 may instruct the SLM controller 534 to cause the micromirror array 519 to project light based on a structured light pattern. In such examples, the camera controller 510 may instruct the camera 542 to take an image of the environment, which may include objects having the structured light pattern on their surfaces. The camera controller 510 may generate 3-D data by determining distortion(s) of the structured light pattern on the object(s) in the image.

While an example manner of implementing the first headlight 104 of FIG. 1, the second headlight 105 of FIG. 1, and/or the first vehicle imaging system 300 of FIGS. 3-4 is illustrated in FIGS. 5-6, one or more of the elements, processes and/or devices illustrated in FIGS. 5-6 may be combined, divided, re-arranged, omitted, eliminated and/or implemented in any other way. Further, the example LIDAR controller 504, the example operating mode determiner 506, the example adaptive headlight controller 508, the example camera controller 510, the example storage 512, and/or, more generally, the example imaging controller 502, the example laser driver 514, the example laser 516, the example SLM 518, the example micromirror array 519, the example dichroic filter 520, the first example detector 524, the second example detector 524, the first example TIA 526, the second example TIA 528, the example multiplexer 530, the example converter 532, the example SLM controller 534, the example SLM PMIC 536, the example light source driver 538, the example illumination source 540, the example camera 542, and/or, more generally, the example second imaging system 500 of FIG. 5 may be implemented by hardware, software, firmware and/or any combination of hardware, software and/or firmware. Thus, for example, any of the example LIDAR controller 504, the example operating mode determiner 506, the example adaptive headlight controller 508, the example camera controller 510, the example storage 512, and/or, more generally, the example imaging controller 502, the example laser driver 514, the example laser 516, the example SLM 518, the example micromirror array 519, the example dichroic filter 520, the first example detector 524, the second example detector 524, the first example TIA 526, the second example TIA 528, the example multiplexer 530, the example converter 532, the example SLM controller 534, the example SLM PMIC 536, the example light source driver 538, the example illumination source 540, the example camera 542, and/or, more generally, the example second imaging system 500 could be implemented by one or more analog or digital circuit(s), logic circuits, programmable processor(s), programmable controller(s), graphics processing unit(s) (GPU(s)), digital signal processor(s) (DSP(s)), ASIC(s), PLD(s), and/or FPLD(s). When reading any of the apparatus or system claims of this patent to cover a purely software and/or firmware implementation, at least one of the example LIDAR controller 504, the example operating mode determiner 506, the example adaptive headlight controller 508, the example camera controller 510, the example storage 512, and/or, more generally, the example imaging controller 502, the example laser driver 514, the first example TIA 526, the second example TIA 528, the example multiplexer 530, the example converter 532, the example SLM controller 534, the example SLM PMIC 536, the example light source driver 538, the example illumination source 540, and/or the example camera 542 is/are hereby expressly defined to include a non-transitory computer readable storage device or storage disk such as a memory, a digital versatile disk (DVD), a compact disk (CD), a Blu-ray disk, etc., including the software and/or firmware. Further still, the first headlight 104 of FIG. 1, the second headlight 105 of FIG. 1, and/or the first vehicle imaging system 300 of FIGS. 3-4 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
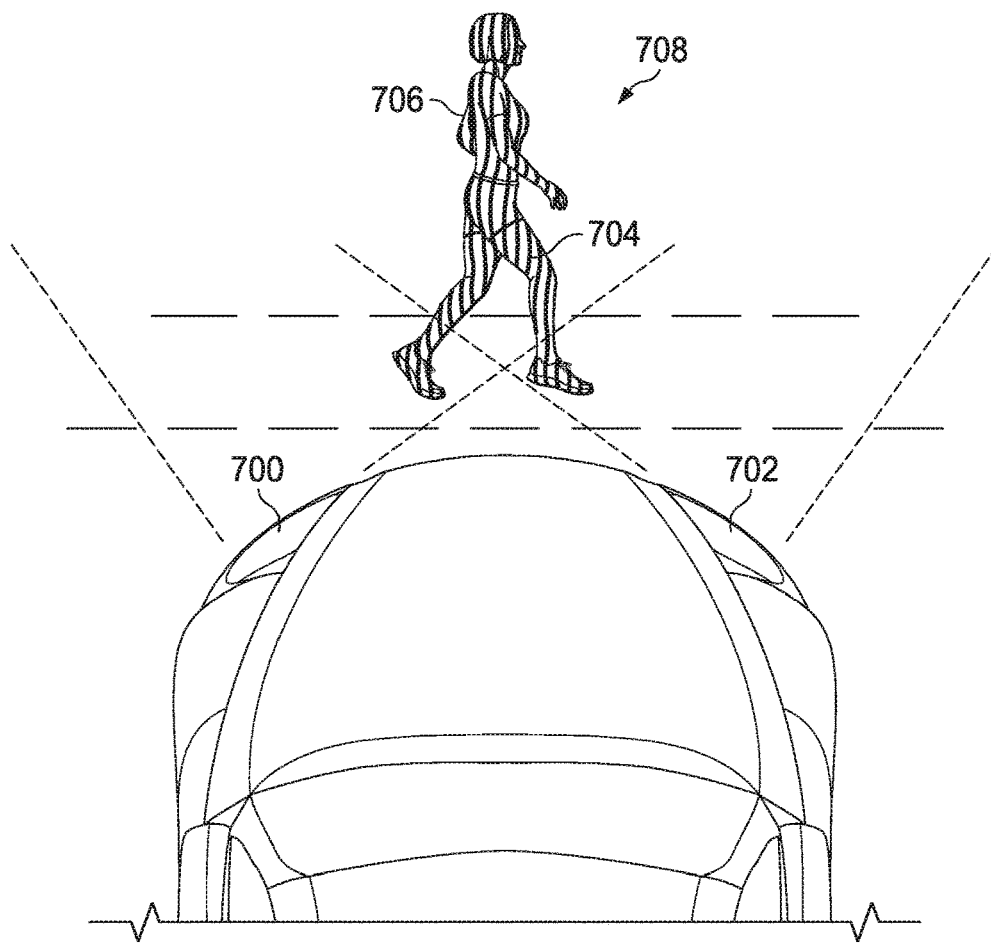
FIG. 7 is an illustration of the adaptive headlights of FIGS. 1 and/or 2, the first example vehicle imaging system of FIGS. 3-4, and/or the second example vehicle imaging system of FIGS. 5-6 generating and capturing an example light pattern on an example environment.

FIG. 7 is an illustration of example adaptive headlights 700, 702 generating an example light pattern 704 onto an example object 706 of an example environment 708. For example, the adaptive headlights 700, 702 of FIG. 7 may implement one(s) of the headlights 104, 105 of FIGS. 1 and/or 2, the first vehicle imaging system 300 of FIGS. 3-4, and/or the second vehicle imaging system 500 of FIGS. 5-6. The adaptive headlights 700, 702 include a first example adaptive headlight 700 and a second example adaptive headlight 702. In this example, the light pattern 704 is a structured light pattern implemented by vertical bars of light. For example, the light pattern 704 may be implemented with a spatially varying 2-D structured illumination generated by a light source or projector modulated by an SLM, such as the micromirror array 519, and/or, more generally, the SLM 518 of FIGS. 5-6.

In some examples, the adaptive headlights 700, 702 include the micromirror array 519, and/or, more generally, the SLM 518 of FIGS. 5-6. In such examples, the SLM controller 534 may control first one(s) of the micromirror array 519 to project light from the light source 540 of the first adaptive headlight 700 to the object 706 and control second one(s) of the micromirror array 519 to reflect light from the light source 540 away from the object 706 to generate the light pattern 704 depicted in FIG. 7. In some such examples, the SLM controller 534 may control first one(s) of the micromirror array 519 to project light from the light source 540 of the second adaptive headlight 702 to the object 706 and control second one(s) of the micromirror array 519 to reflect light from the light source 540 away from the object 706 to generate the light pattern 704 depicted in FIG. 7.

The adaptive headlights 700, 702 may acquire and/or otherwise capture a 2-D image of the object 706, and/or, more generally, the environment 708 under the structured-light illumination depicted in FIG. 7. For example, the adaptive headlights 700, 702 may include the camera 542 of FIGS. 5-6 to capture one or more 2-D images of the object 706. In this example, the object 706 has non-planar surfaces and, thus, the geometric shapes of the non-planar surfaces distort the light pattern 704 as viewed from the camera 542. Advantageously, the adaptive headlights 700, 702 may extract and/or otherwise identify a 3-D surface shape of the object 706 based on the data from the distortion of the projected structured-light pattern. For example, the adaptive headlights 700, 702 may determine a 3-D surface profile, shape, etc., of the object 706 using triangulation-based 3-D imaging techniques including a sequential projection technique, a continuous varying pattern technique, a stripe indexing technique, a grid indexing technique, etc., and/or a combination thereof.

Figure 8:
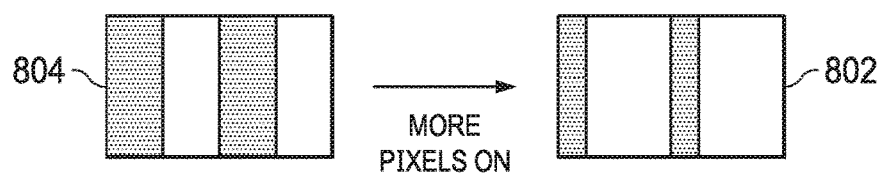
FIG. 8 is an illustration of a first example light pattern that may be generated by the adaptive headlights of FIGS. 1 and/or 2, the first example vehicle imaging system of FIGS. 3-4, and/or the second example vehicle imaging system of FIGS. 5-6.

FIG. 8 is an illustration of a first example light pattern 802 that may be generated by the adaptive headlights 700, 702 of FIG. 7. For example, the first light pattern 802 may be generated by the headlights 104, 105 of FIGS. 1 and/or 2, the first vehicle imaging system 300 of FIGS. 3-4, and/or the second vehicle imaging system 500 of FIGS. 5-6.

The first light pattern 802 is a structured light pattern implemented by vertical bars of light. Alternatively, the first light pattern 802 may be implemented using any other pattern of light, such as horizontal bars, a grid, etc. Advantageously, the first light pattern 802 has a majority of the pixels on (e.g., pixels corresponding to ones of the micromirror array 519 of FIGS. 5-6) to reduce light loss in headlight functionality because structured light patterns and headlight patterns are time multiplexed. For example, the first light pattern 802 has more pixels on compared to a second example light pattern 804.

Figure 9:
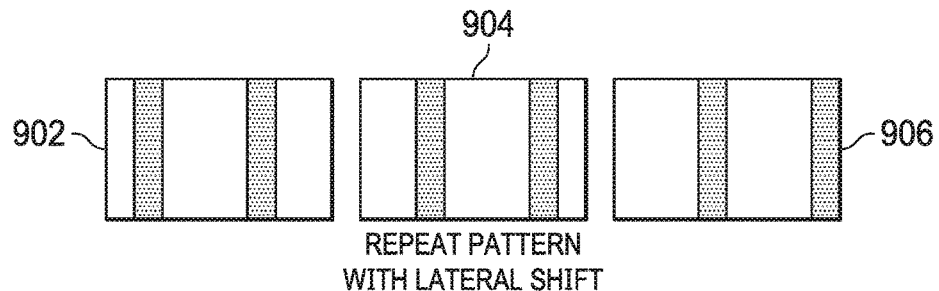
FIG. 9 is an illustration of a second example light pattern that may be generated by the adaptive headlights of FIGS. 1 and/or 2, the first example vehicle imaging system of FIGS. 3-4, and/or the second example vehicle imaging system of FIGS. 5-6.

FIG. 9 is an illustration of a third example light pattern 902, a fourth example light pattern 904, and a fifth example light pattern 906 that may be generated by the adaptive headlights 700, 702 of FIG. 7. For example, the third light pattern 902, the fourth light pattern 904, and/or the fifth light pattern 906 may be generated by the headlights 104, 105 of FIGS. 1 and/or 2, the first vehicle imaging system 300 of FIGS. 3-4, and/or the second vehicle imaging system 500 of FIGS. 5-6.

The third light pattern 902, the fourth light pattern 904, and the fifth light pattern 906 are structured light patterns implemented by vertical bars of light. Alternatively, one or more of the third light pattern 902, the fourth light pattern 904, and/or the fifth light pattern 906 may be implemented using any other pattern of light, such as horizontal bars, a grid, etc.

In the illustrated example of FIG. 9, the adaptive headlights 700, 702 may generate the third light pattern 902 at a first time, the fourth light pattern 904 at a second time after the first time, and the fifth light pattern 906 at a third time after the second time. In this example, the third light pattern 902, the fourth light pattern 904, and the fifth light pattern 906 have the same pattern but each are laterally shifted from a previous light pattern. Advantageously, the adaptive headlights 700, 702 may laterally shift the light patterns 902, 904, 906 to avoid bright and dark spots from reducing efficiency in processing camera images of the light patterns 902, 904, 906.

Figure 10:
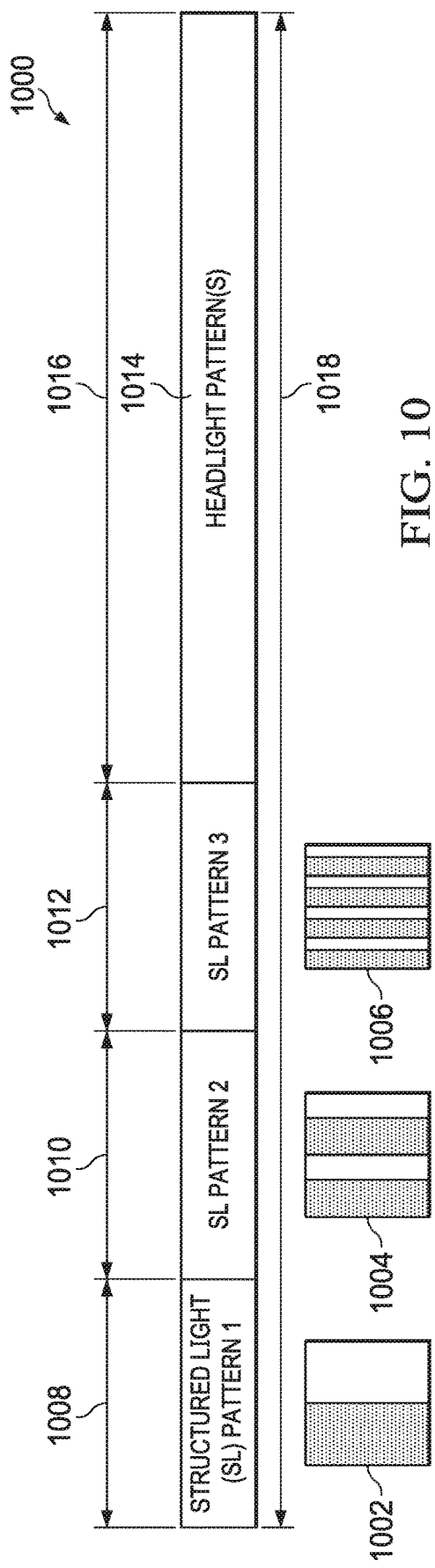
FIG. 10 is a first timing diagram of a first example implementation of generating first example structured light patterns that may be generated by the adaptive headlights of FIGS. 1 and/or 2, the first example vehicle imaging system of FIGS. 3-4, and/or the second example vehicle imaging system of FIGS. 5-6.

FIG. 10 is a first timing diagram 1000 of a first example implementation of generating example structured light patterns 1002, 1004, 1006 that may be generated by the adaptive headlights 700, 702 of FIG. 7. For example, the structured light patterns 1002, 1004, 1006 may be generated by the headlights 104, 105 of FIGS. 1 and/or 2, the first vehicle imaging system 300 of FIGS. 3-4, and/or the second vehicle imaging system 500 of FIGS. 5-6. The structured light patterns 1002, 1004, 1006 include a first example structured light pattern 1002, a second example structured light pattern 1004, and a third example structured light pattern 1006, which are structured light patterns implemented by vertical bars of light. For example, the first structured light pattern 1002 includes a first vertical bar that is dark or absence of light followed by a second vertical bar that is light filled. The second structured light pattern 1004 includes a first vertical bar that is dark or absence of light, followed by a second vertical bar that is light filled, a third vertical bar that is dark, and a fourth vertical bar that is light filled. The third structured light pattern 1006 includes a first vertical bar of darkness, followed by a second light vertical bar of light, a third vertical bar of darkness, a fourth vertical bar of light, a fifth vertical bar of darkness, a sixth vertical bar of light, a seventh vertical bar of darkness, and an eighth vertical bar of light. Alternatively, one or more of the first structured light pattern 1002, the second structured light pattern 1004, and/or the third structured light pattern 1006 may be implemented using any other pattern of light, such as horizontal bars, a grid, etc.

In this example, the first adaptive headlight 700 and/or the second adaptive headlight 702 may generate the structured light patterns 1002, 1004, 1006 based on a geometric sequence (e.g., a number of vertical bars of light=$2^N$, where N is the sequence number). For example, the first adaptive headlight 700 may implement the first structured light pattern 1002 by controlling first micromirror(s) of the micromirror array 519 to reflect light from the light source 540 away from the scene 328 to create the first vertical bar of darkness and controlling second micromirror(s) of the micromirror array 519 to reflect light from the light source 540 to the scene 328 to create the first vertical bar of light (e.g., 1 bar of light=$2^0$). The first adaptive headlight 700 may implement the second structured light pattern 1004 with at least two vertical bars of light (e.g., 2 bars of light=$2^1$). The first adaptive headlight 700 may implement the third structured light pattern 1006 with at least four bars of light (e.g., 4 bars of light=$2^2$).

The vertical bars of light and the vertical bars of darkness have different widths in the structured light patterns 1002, 1004, 1006. In the first structured light pattern 1002, a first width of the first vertical bar of light is substantially the same as a second width of the first vertical bar of darkness. In the second structured light pattern 1004, third widths of the vertical bars of light are narrower and/or otherwise different from fourth widths of the vertical bars of darkness. In the third structured light pattern 1006, fifth widths of the vertical bars of light are narrower and/or otherwise different from sixth widths of the vertical bars of darkness. In this example, the first width is greater than the third widths and the fifth widths. In this example, the second width is greater than the fourth widths and the sixth widths.

Advantageously, the adaptive headlights 700, 702 may use fewer patterns for high resolution by implementing the geometric sequence. The adaptive headlights 700, 702 may avoid motion blur artifacts by effectuating relatively fast exposure times and enforcing the dependency in processing from one pattern to another. In some examples, the adaptive headlights 700, 702 may reduce the maximum headlight brightness by approximately 50% while the structured light patterns 1002, 1004, 1004 are being projected and/or otherwise enabled.

During a first example time 1008, the first adaptive headlight 700 may reflect and/or otherwise project the first structured light pattern 1002 onto an object (e.g., the object 706 of FIG. 7), an environment (e.g., the environment 708 of FIG. 7), etc. During a second example time 1010, the first adaptive headlight 700 may reflect and/or otherwise project the second structured light pattern 1004 onto the object, the environment, etc. During a third example time 1012, the first adaptive headlight 700 may reflect and/or otherwise project the third structured light pattern 1006 onto the object, the environment, etc. In this example, the first time 1008, the second time 1010, and the third time 1012 are each 100 microseconds (us). Alternatively, the first time 1008, the second time 1010, and/or the third time 1012 may be different than 100 us. In some examples, one(s) of the first time 1008, the second time 1010, and the third time 1012 correspond to a camera exposure time, a SLM load time, etc. For example, each of the first time 1008, the second time 1010, and the third time 1012 may correspond to the exposure time of the camera 542 of FIGS. 5-6, the load time of one(s) of the micromirror(s) of the micromirror array 519 of FIGS. 5-6, etc. In some examples, one or more of the first time 1008, the second time 1010, and/or the third time 1012 may be 50 us, 100 us, 150 us, etc., in duration.

In the first timing diagram 1000, the first adaptive headlight 700 may project example headlight pattern(s) 1014 during a fourth example time 1016. For example, the headlight pattern(s) 1014 may implement one or more headlight patterns. In such examples, the headlight pattern(s) 1014 may correspond to the first headlight pattern 204 of FIG. 2 and/or the second headlight pattern 206 of FIG. 2. In some examples, after the fourth time 1016, the first adaptive headlight 700 may execute another iteration of the first timing diagram 1000 by projecting the first structured light pattern 1002 for a time period corresponding to the first time 1008. In this example, a sum of the first through fourth times 1008, 1010, 1012, 1016 represent an example frame time 1018 of the first adaptive headlight 700. For example, the frame time 1018 may be 120 Hertz (Hz) or approximately 8.3 milliseconds (ms). Alternatively, the frame time 1018 may be any other frequency or amount of time.

Figure 11:
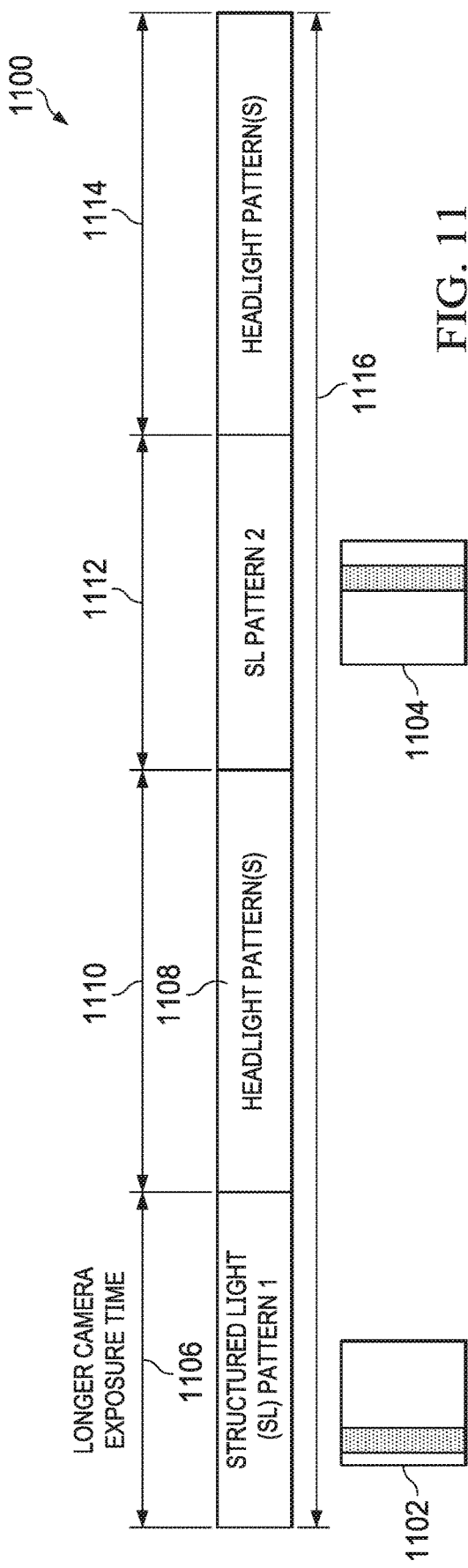
FIG. 11 is a second timing diagram of a second example implementation of generating second example structured light patterns that may be generated by the adaptive headlights of FIGS. 1 and/or 2, the first example vehicle imaging system of FIGS. 3-4, and/or the second example vehicle imaging system of FIGS. 5-6.

FIG. 11 is a second timing diagram 1100 of a second example implementation of generating example structured light patterns 1102, 1104 that may be generated by the adaptive headlights 700, 702 of FIG. 7. For example, the structured light patterns 1102, 1104 may be generated by the headlights 104, 105 of FIGS. 1 and/or 2, the first vehicle imaging system 300 of FIGS. 3-4, and/or the second vehicle imaging system 500 of FIGS. 5-6. The structured light patterns 1102, 1104 include a first example structured light pattern 1102 and a second example structured light pattern 1104, which are structured light patterns implemented by vertical bars of light. Alternatively, the first structured light pattern 1102 and/or the second structured light pattern 1104 may be implemented using any other pattern of light, such as horizontal bars, a grid, etc.

In this example, the first adaptive headlight 700 may generate the structured light patterns 1102, 1104 as high saturation, one-shot structured light patterns. For example, the first adaptive headlight 700 may project the first structured light pattern 1102 during a first example time 1106, example headlight pattern(s) 1108 during a second example time 1110, the second structured light pattern 1104 during a third example time 1112, and the headlight pattern(s) 1108 during a fourth example time 1114. Advantageously, the adaptive headlights 700, 702 may increase the camera exposure time compared to the first timing diagram 1000 of FIG. 10 while still reducing motion blur artifacts because there is no pattern dependency like the binary pattern depicted in FIG. 10. Advantageously, the adaptive headlights 700, 702 may effectuate less reduction in the maximum headlight brightness while the structured light patterns 1102, 1104 are on compared to the first timing diagram 1000. In some examples, less resolution and more patterns are needed to achieve the same resolution as traditional patterns while using the high saturation, one-shot structured light patterns depicted in FIG. 11.

The headlight pattern(s) 1108 may implement one or more headlight patterns. In such examples, the headlight pattern(s) 1108 may correspond to the first headlight pattern 204 of FIG. 2 and/or the second headlight pattern 206 of FIG. 2. In some examples, the headlight pattern(s) 1108 during the second time 1110 are different from the headlight pattern(s) 1108 during the fourth time 1114.

In some examples, after the fourth time 1114, the first adaptive headlight 700 may execute another iteration of the second timing diagram 1100 by projecting the first structured light pattern 1102 for a time period corresponding to the first time 1106. In this example, a sum of the first through fourth times 1106, 1110, 1112, 1114 represent an example frame time 1116 of the first adaptive headlight 700. For example, the frame time 1116 may be 120 Hertz (Hz) or approximately 8.3 milliseconds (ms). Alternatively, the frame time 1116 of the second timing diagram 1100 may be any other frequency or amount of time.

An example day and night use model associated with the headlights 104, 105 of FIGS. 1 and/or 2, the first vehicle imaging system 300 of FIGS. 3-4, the second example vehicle imaging system 500 of FIGS. 5-6, and/or the adaptive headlights 700, 702 of FIG. 7 is below in Table 1.

TABLE 1

Adaptive Headlight Day and Night Use Model

| HARDWARE | DAYTIME OPERATING MODE | NIGHTTIME OPERATING MODE |
| --- | --- | --- |
| HEADLIGHT | OFF | ON, OPTICAL PATH INCLUDES LIGHT SOURCE AND SLM |
| LIDAR | ON, OPTICAL PATH INCLUDES SLM AND FIRST DETECTOR | ON, OPTICAL PATH INCLUDES SECOND DETECTOR |
| CAMERA | ON, CAPTURES IMAGES FOR STEREO IMAGING GENERATION | ON, CAPTURES IMAGES FOR 3-D DATA GENERATION BASED ON STRUCTURED LIGHT PATTERNS |
| SPATIAL LIGHT MODULATOR (SLM) | ON, SUPPORTS AMBIENT LIGHT REJECTION FOR LIDAR | ON, TIME MULTIPLEXES HEADLIGHT AND STRUCTURED LIGHT PATTERNS |
| FIRST DETECTOR | USED, SUPPORTS LIDAR | NOT USED |
| SECOND DETECTOR | NOT USED | USED, SUPPORTS LIDAR |

For example, the headlights 104, 105 may be turned off during daytime because they may not be needed and may be turned on during nighttime. The LIDAR system 108 of FIG. 1 may be turned on during daytime with a first optical path that includes the SLM 126 and the first detector 120 of FIG. 1. The LIDAR system 108 may be turned on during nighttime with a second optical path that includes the second detector 122 of FIG. 1. The camera 112 of FIG. 1 may be turned on during daytime to capture images to support stereo imaging generation. The camera 112 may be turned on during nighttime to capture images for 3-D data generation based on structured light patterns.

In the example of Table 1 above, the SLM 126 may be turned on during daytime to support ambient light rejection for the LIDAR system 108. The SLM 126 may be turned on during nighttime to time multiplex headlight and structured light patterns, as described above in connection with the timing diagrams 1000, 1100 of FIGS. 10 and/or 11. The first detector 120 may be used during daytime to support the LIDAR system 108 by detecting reflected IR light from an object, an environment, etc., of interest. The first detector 120 may not be used during nighttime. The second detector 122 may not be used during daytime. The second detector 122 may be used during nighttime to support the LIDAR system 108 by detecting reflected IR from an object, an environment, etc., of interest. Advantageously, the headlights 104, 105 of FIGS. 1 and/or 2, the first vehicle imaging system 300 of FIGS. 3-4, the second example vehicle imaging system 500 of FIGS. 5-6, and/or the adaptive headlights 700, 702 of FIG. 7 may effectuate different imaging functions, tasks, etc., by using the same hardware, software, firmware, and/or combination thereof and/or portions thereof.

Flowcharts representative of example hardware logic, machine readable instructions, hardware implemented state machines, and/or any combination thereof for implementing the example imaging controller 502 of FIG. 5 are shown in FIGS. 12A-15. The machine readable instructions may be one or more executable programs or portion(s) of an executable program for execution by a computer processor and/or processor circuitry, such as the processor 1612 shown in the example processor platform 1600 discussed below in connection with FIG. 16. The program may be embodied in software stored on a non-transitory computer readable storage medium such as a CD-ROM, a floppy disk, a hard drive, a DVD, a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowcharts illustrated in FIGS. 12A-15, many other methods of implementing the example imaging controller 502 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the instructions on a particular computing device or other device. In another example, the machine readable instructions may need to be configured (e.g., settings stored, data input, network addresses recorded, etc.) before the machine readable instructions and/or the corresponding program(s) may be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein may be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 12A-15 may be implemented using executable instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" may be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 12B:
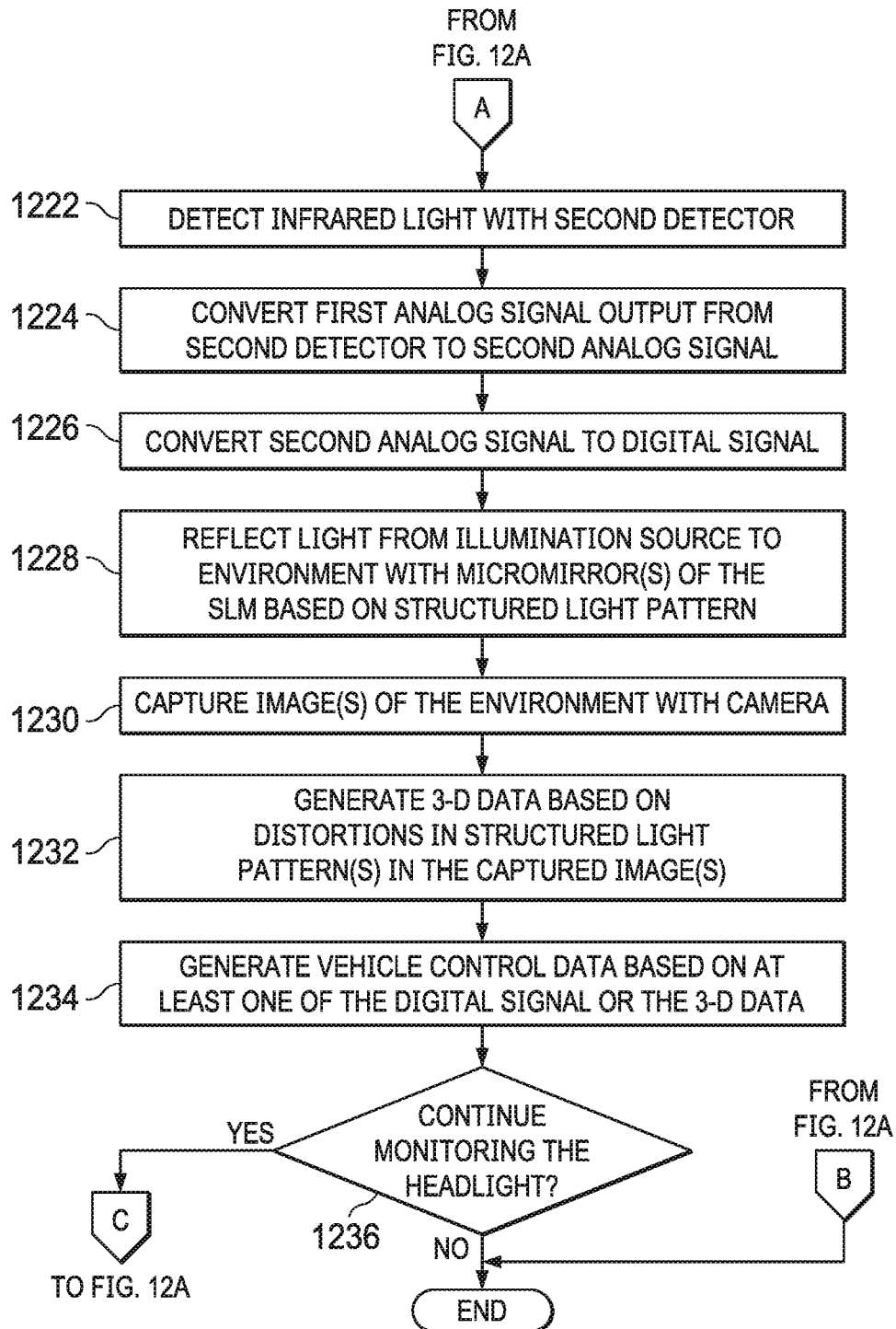

FIGS. 12A-12B illustrate a flowchart representative of example system (e.g., an optical system) 1200 include the headlights 104, 105 of FIGS. 1 and/or 2, the first example vehicle imaging system 300 of FIGS. 3-4, and/or the second example vehicle imaging system 500 of FIGS. 5-6 to facilitate vehicle control based on an operating mode of a headlight. The optical system 1200 of FIGS. 12A-12B begin at block 1202, at which the second vehicle imaging system 500 reflects infrared light from a laser to an environment with a mirror. For example, the laser mirror 515 may reflect infrared light from the laser 516 to the scene 328 of FIG. 3.

At block 1204, the second vehicle imaging system 500 determines whether the operating mode of a headlight is a nighttime or reduced lighting headlight operating mode. For example, the operating mode determiner 506 may determine whether the headlight 104, 105 is to operate in a daytime or nighttime headlight operating mode based on a timestamp, a command from an operator of the vehicle 102, etc.

If, at block 1204, the second vehicle imaging system 500 determines that the operating mode of the headlight is not the nighttime or reduced lighting headlight operating mode (e.g., the headlight operating mode is the daytime headlight operating mode), then, at block 1206, the second vehicle imaging system 500 reflects infrared light from the laser reflected by the environment to a first detector with first micromirrors(s) of a spatial light modulator (SLM). For example, the SLM controller 534 may control first one(s) of the micromirror array 519 to reflect infrared light from the scene 328 to the first detector 524. In some examples, the output from the second detector 525 is ignored and/or otherwise not delivered to the LIDAR controller 504. In some examples, the second detector 525 is disabled in response to determining that the headlight operating mode is the daytime headlight operating mode.

At block 1208, the second vehicle imaging system 500 reflects ambient light from the environment away from the first detector with second micromirror(s) of the SLM. For example, the SLM controller 534 may control second one(s) of the micromirror array 519 to reflect ambient light from the scene 328 away from the first detector 524.

At block 1210, the second vehicle imaging system 500 converts a first analog signal output from the first detector to a second analog signal. For example, the first TIA 526 may convert a current output from the first detector 524 into a voltage.

At block 1212, the second vehicle imaging system 500 converts the second analog signal to a digital signal. For example, the converter 532 may convert the voltage from the first TIA 526 to a digital signal that represents the voltage.

At block 1214, the second vehicle imaging system 500 captures images of the environment with camera(s). For example, the camera 542 may capture image(s) of the scene 328.

At block 1216, the second vehicle imaging system 500 generates stereo image(s) based on the captured image(s). For example, the camera controller 510 may generate a stereo image based on first image(s) from the camera 542 and second image(s) from another instance of the camera 542.

At block 1218, the second vehicle imaging system 500 generates vehicle control data based on at least one of the digital signal or the stereo image(s). For example, the LIDAR controller 504 may generate vehicle control data that may be used by the vehicle 102 to facilitate control of the vehicle 102 or system(s), portion(s), etc., thereof based on the 3-D data associated with the reflected infrared light, which may be represented by the digital signal. In such examples, the vehicle 102 may control a speed, a steering direction, etc., of the vehicle 102 based on the vehicle control data. In some examples, the camera controller 510 may generate vehicle control data that may be used by the vehicle 102 to facilitate control of the vehicle 102 or system(s), portion(s), etc., thereof based on 3-D data associated with the stereo image(s). In such examples, the vehicle 102 may control a speed, a steering direction, etc., of the vehicle 102 based on the vehicle control data. In some examples, the ECU(s) 106 may transmit the vehicle control data to the HUD 202 of FIG. 2 to present the vehicle control data or portion(s) thereof to an operator of the vehicle 102.

In response to generating the vehicle control data based on at least one of the digital signal or the stereo image(s) at block 1218, then, at block 1220, the second vehicle imaging system 500 determines whether to continue monitoring the headlight. If, at block 1220, the second vehicle imaging system 500 determines to continue monitoring the headlight, control returns to block 1204. If, at block 1220, the second vehicle imaging system 500 determines not to continue monitoring the headlight, then the example system 1200 of FIGS. 12A-12B ceases operation.

If, at block 1204, the second vehicle imaging system 500 determines that the operating mode of the headlight is the nighttime or reduced lighting headlight operating mode, control proceeds to block 1222 to detect infrared light with a second detector. For example, the second detector 525 may detect infrared light transmitted by the laser that has been reflected from the scene 328.

At block 1224, the second vehicle imaging system 500 converts a first analog signal output from the second detector to a second analog signal. For example, the second TIA 528 may convert a current output from the second detector 525 into a voltage.

At block 1226, the second vehicle imaging system 500 converts the second analog signal to a digital signal. For example, the converter 532 may convert the voltage from the second TIA 528 into a digital signal.

At block 1228, the second vehicle imaging system 500 produces light by an illumination source and reflects the light to the environment with micromirror(s) of the SLM based on a structured light pattern. For example, the SLM controller 534 may (i) control first one(s) of the micromirror(s) of the micromirror array 519 to reflect light from the light source 540 to the scene 328 to generate vertical bar(s) of light and (ii) control second one(s) of the micromirror(s) of the micromirror array 519 to reflect light from the light source 540 away from the scene to generate vertical bar(s) of darkness based on a structured light pattern, such as one(s) of the structured light patterns 1002, 1004, 1006 of FIG. 10.

At block 1230, the second vehicle imaging system 500 captures image(s) of the environment with a camera. For example, the camera 542 may capture image(s) of the object 706 in the environment 708 based on a reflection of the structured light produced in the block 1228.

At block 1232, the second vehicle imaging system 500 generates 3-D data based on distortions in structured light pattern(s) in the captured image(s). For example, the camera controller 510 may identify distortions in the structured light pattern and generate 3-D data based on the identified distortions.

At block 1234, the second vehicle imaging system 500 generates vehicle control data based on at least one of the digital signal or the 3-D data. For example, the LIDAR controller 504 may generate vehicle control data that may be used by the vehicle 102 to facilitate control of the vehicle 102 or system(s), portion(s), etc., thereof based on the 3-D data associated with the reflected infrared light, which may be represented by the digital signal. In such examples, the vehicle 102 may control a speed, a steering direction, etc., of the vehicle 102 based on the vehicle control data. In some examples, the camera controller 510 may generate vehicle control data that may be used by the vehicle 102 to facilitate control of the vehicle 102 or system(s), portion(s), etc., thereof based on the 3-D data associated with the distortion(s) captured in the image(s). In such examples, the vehicle 102 may control a speed, a steering direction, etc., of the vehicle 102 based on the vehicle control data.

In response to generating the vehicle control data at block 1234, the second vehicle imaging system 500 determines whether to continue monitoring the headlight at block 1236. If, at block 1236, the second vehicle imaging system 500 determines to continue monitoring the headlight, control returns to block 1204. If, at block 1236, the second vehicle imaging system 500 determines not to continue monitoring the headlight, then the example system 1200 of FIGS. 12A-12B ceases and/or otherwise concludes operation.

Figure 13:
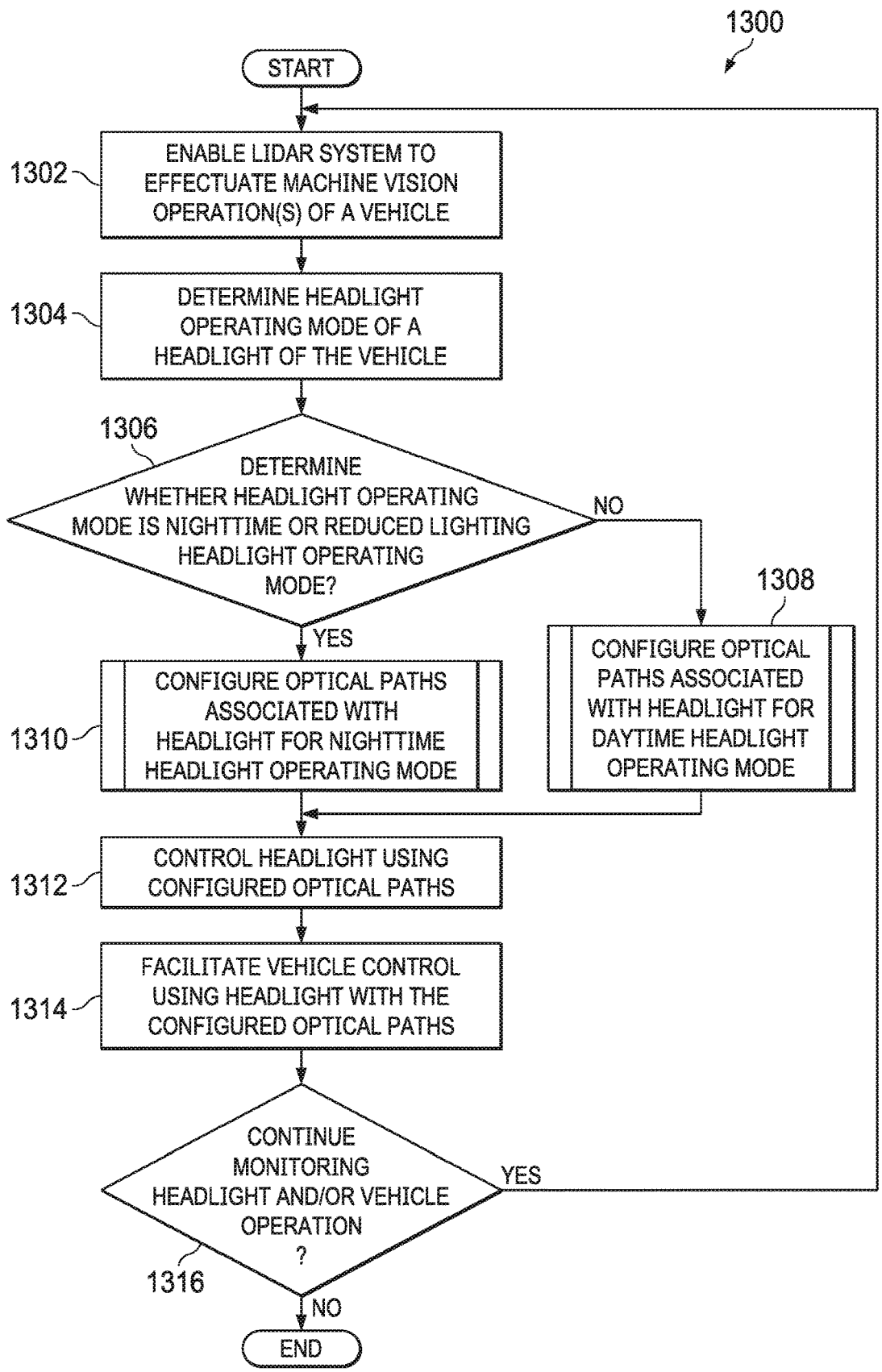
FIG. 13 is a flowchart representative of example machine readable instructions that may be executed to implement the adaptive headlights of FIGS. 1 and/or 2, the first example vehicle imaging system of FIGS. 3-4, and/or the second example vehicle imaging system of FIGS. 5-6 to facilitate vehicle control using a headlight with a configured optical path.

FIG. 13 is a flowchart representative of example machine readable instructions 1300 that may be executed to implement the headlights 104, 105 of FIGS. 1 and/or 2, the first vehicle imaging system 300 of FIGS. 3-4, the second vehicle imaging system 500 of FIGS. 5-6, and/or the adaptive headlights 700, 702 of FIG. 7 to facilitate control of the vehicle 102 of FIGS. 1-2. The machine readable instructions 1300 of FIG. 13 begin at block 1302, at which the imaging controller 502 (FIG. 5) enables a LIDAR system to effectuate machine vision operation(s) of a vehicle. For example, the LIDAR controller 504 (FIG. 5) may control the mirror 118 (FIG. 1) to reflect IR light from the laser 116 (FIG. 1). In such examples, the LIDAR controller 504 may enable and/or otherwise turn on the laser 116 to project the IR light for LIDAR sensing.

At block 1304, the imaging controller 502 determines a headlight operating mode of a headlight of the vehicle. For example, the operating mode determiner 506 (FIG. 5) may determine a headlight operating mode of the headlight 104, 105 based on at least one of time data, environmental data, or user control data.

At block 1306, the imaging controller 502 determines whether the headlight operating mode is a nighttime or reduced lighting headlight operating mode. For example, the operating mode determiner 506 may determine whether the headlight 104, 105 is to operate in a daytime or nighttime headlight operating mode based on a timestamp, a command from an operator of the vehicle 102, etc.

If, at block 1306, the imaging controller 502 determines that the headlight operating mode is the nighttime or reduced lighting headlight operating mode, control proceeds to block 1310 to configure optical paths associated with the headlight for the nighttime headlight operating mode. An example process that may be executed to implement block 1310 is described below in connection with FIG. 15. For example, the adaptive headlight controller 508 (FIG. 5) may turn on the light source 540 (FIG. 5) and control one(s) of the micromirror array 519 (FIG. 5) to project the light from the light source 540. In such examples, the LIDAR controller 504 may receive reflected IR light from a scanned environment via the second detector 525 (FIG. 5).

If, at block 1306, the imaging controller 502 determines that the headlight operating mode is not the nighttime or reduced lighting headlight operating mode (e.g., the headlight operating mode is the daytime headlight operating mode), then, at block 1308, the imaging controller 502 configures optical paths associated with the headlight for the daytime headlight operating mode. An example process that may be executed to implement block 1308 is described below in connection with FIG. 14. For example, the adaptive headlight controller 508 may turn off the light source 540 and control one(s) of the micromirror array 519 to reject ambient light from a scanned environment. In such examples, the LIDAR controller 504 may receive reflected IR light from the scanned environment via the first detector 524 (FIG. 5).

In response to configuring the optical paths at block 1308 or block 1310, the imaging controller 502 in block 1312, controls the headlight using the configured optical paths. For example, the adaptive headlight controller 508 may project a headlight pattern, a structured light pattern, etc., during nighttime. In other examples, the adaptive headlight controller 508 may control the micromirror array 519 to reject ambient light from the scanned environment.

At block 1314, the imaging controller 502 facilitates vehicle control using the headlight with the configured optical paths. For example, the adaptive headlight controller 508 may improve safety for an operator while operating the vehicle 102 by projecting the headlight pattern, the structured light pattern, etc., during nighttime. In other examples, the adaptive headlight controller 508 may improve operation of the LIDAR system 108 and thereby improve safety for the operator of the vehicle 102 by rejecting ambient light from the scanned environment.

At block 1316, the imaging controller 502 determines whether the continue monitoring the headlight and/or vehicle operation. If, at block 1316, the imaging controller 502 determines to continue monitoring the headlight and/or vehicle operation, control returns to block 1302 to enable the LIDAR system to effectuate machine vision operation(s) of the vehicle, otherwise the machine readable instructions 1300 of FIG. 13 conclude.

Figure 14:
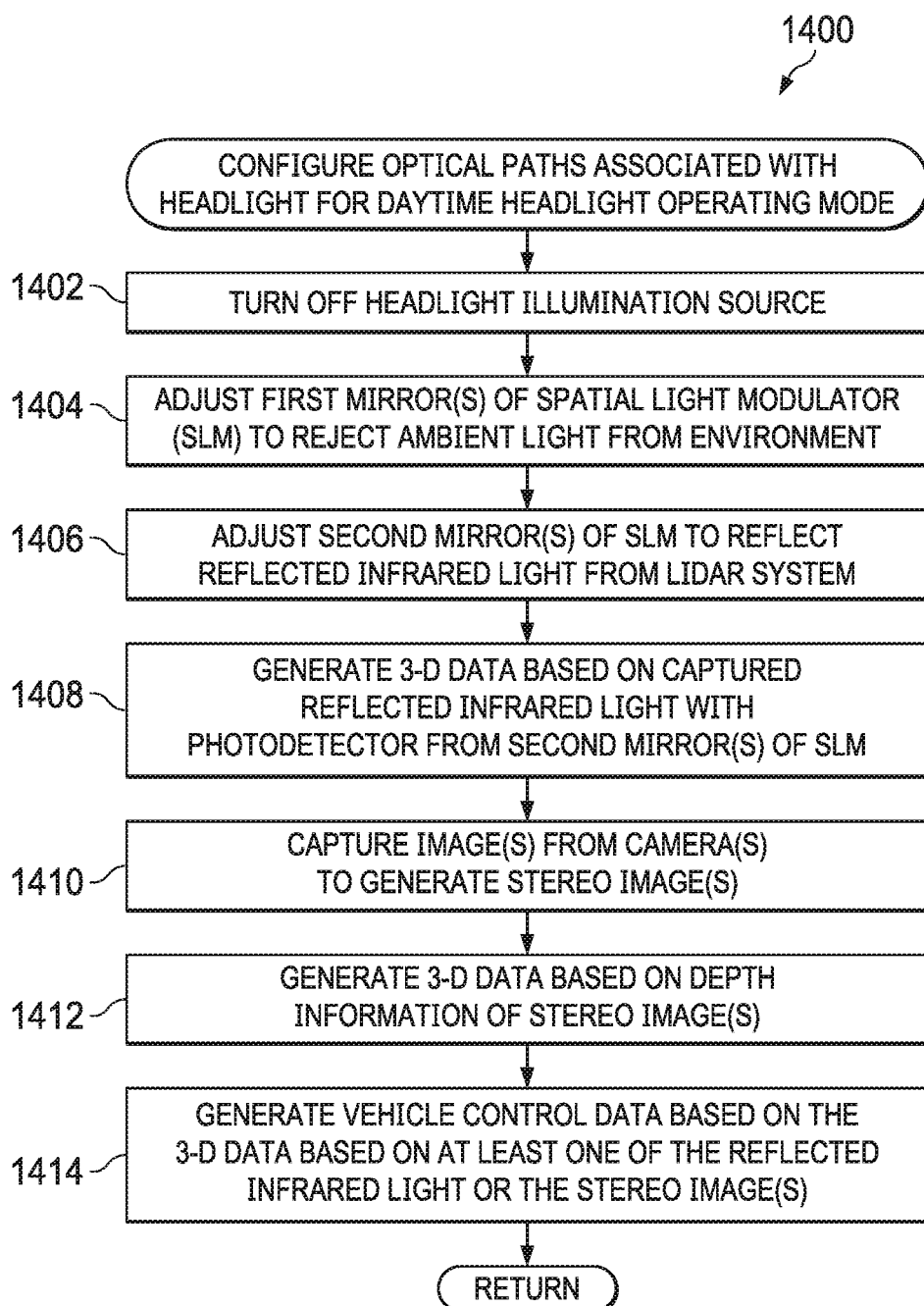
FIG. 14 is a flowchart representative of example machine readable instructions that may be executed to implement the adaptive headlights of FIGS. 1 and/or 2, the first example vehicle imaging system of FIGS. 3-4, and/or the second example vehicle imaging system of FIGS. 5-6 to configure optical paths associated with a headlight for a daytime headlight operating mode.

FIG. 14 is a flowchart representative of example machine readable instructions 1400 that may be executed to implement the headlights 104, 105 of FIGS. 1 and/or 2, the first vehicle imaging system 300 of FIGS. 3-4, the second vehicle imaging system 500 of FIGS. 5-6, and/or the adaptive headlights 700, 702 of FIG. 7 to configure optical paths associated with a headlight for a daytime headlight operating mode. The machine readable instructions 1400 of FIG. 14 may be executed to implement block 1308 of the machine readable instructions 1300 of FIG. 13.

The machine readable instructions 1400 of FIG. 14 begin at block 1402, at which the imaging controller 502 (FIG. 5) turns off a headlight illumination source. For example, the adaptive headlight controller 508 (FIG. 5) may instruct the light source driver 538 (FIG. 5) to turn off the light source 540 (FIG. 5).

At block 1404, the imaging controller 502 adjusts first mirror(s) of a spatial light modulator (SLM) to reject ambient light from an environment. For example, the adaptive headlight controller 508 may direct the SLM controller 534

(FIG. 5) to adjust position(s) of first one(s) of the micromirrors of the micromirror array 519 (FIG. 5) to reject ambient light from an environment of the vehicle 102.

At block 1406, the imaging controller 502 adjusts second mirror(s) of the SLM to direct the reflected infrared light from a LIDAR system. For example, the adaptive headlight controller 508 may direct the SLM controller 534 to adjust position(s) of second one(s) of the micromirrors of the micromirror array 519 to receive infrared light reflected from the environment of the vehicle 102, which was transmitted to the environment from the laser 516 (FIG. 5).

At block 1408, the imaging controller 502 generates 3-D data based on the captured reflected infrared light with a photodetector from the second mirror(s) of the SLM. For example, the LIDAR controller 504 (FIG. 5) may generate 3-D data, such as distance measurement(s), of an object in the environment with respect to the vehicle 102 based on the reflected infrared light received by the micromirror array 519.

At block 1410, the imaging controller 502 captures image(s) from camera(s) to generate stereo image(s). For example, the camera controller 510 (FIG. 5) may control one or more instances of the camera 542 (FIG. 5) to capture one or more images of the environment to support the generation of stereo image(s).

At block 1412, the imaging controller 502 generates 3-D data based on depth information of the stereo image(s). For example, the camera controller 510 may generate 3-D data, such as distance measurement(s), of an object in the environment with respect to the vehicle 102 based on information associated with the stereo image(s), such as depth information.

At block 1414, the imaging controller 502 generates vehicle control data based on the 3-D data based on at least one of the reflected infrared light or the stereo image(s). For example, the LIDAR controller 504 may generate vehicle control data that may be used by the vehicle 102 to facilitate control of the vehicle 102 or system(s), portion(s), etc., thereof based on the 3-D data associated with the reflected infrared light. In such examples, the vehicle 102 may control a speed, a steering direction, etc., of the vehicle 102 based on the vehicle control data. In some examples, the camera controller 510 may generate vehicle control data that may be used by the vehicle 102 to facilitate control of the vehicle 102 or system(s), portion(s), etc., thereof based on the 3-D data associated with the stereo image(s). In such examples, the vehicle 102 may control a speed, a steering direction, etc., of the vehicle 102 based on the vehicle control data. In some examples, the ECU(s) 106 may transmit the vehicle control data to the HUD 202 of FIG. 2 to present the vehicle control data or portion(s) thereof to an operator of the vehicle 102. In response to generating the vehicle control data at block 1414, the machine readable instructions 1400 of FIG. 14 return to block 1312 of the machine readable instructions 1300 of FIG. 13.

Figure 15:
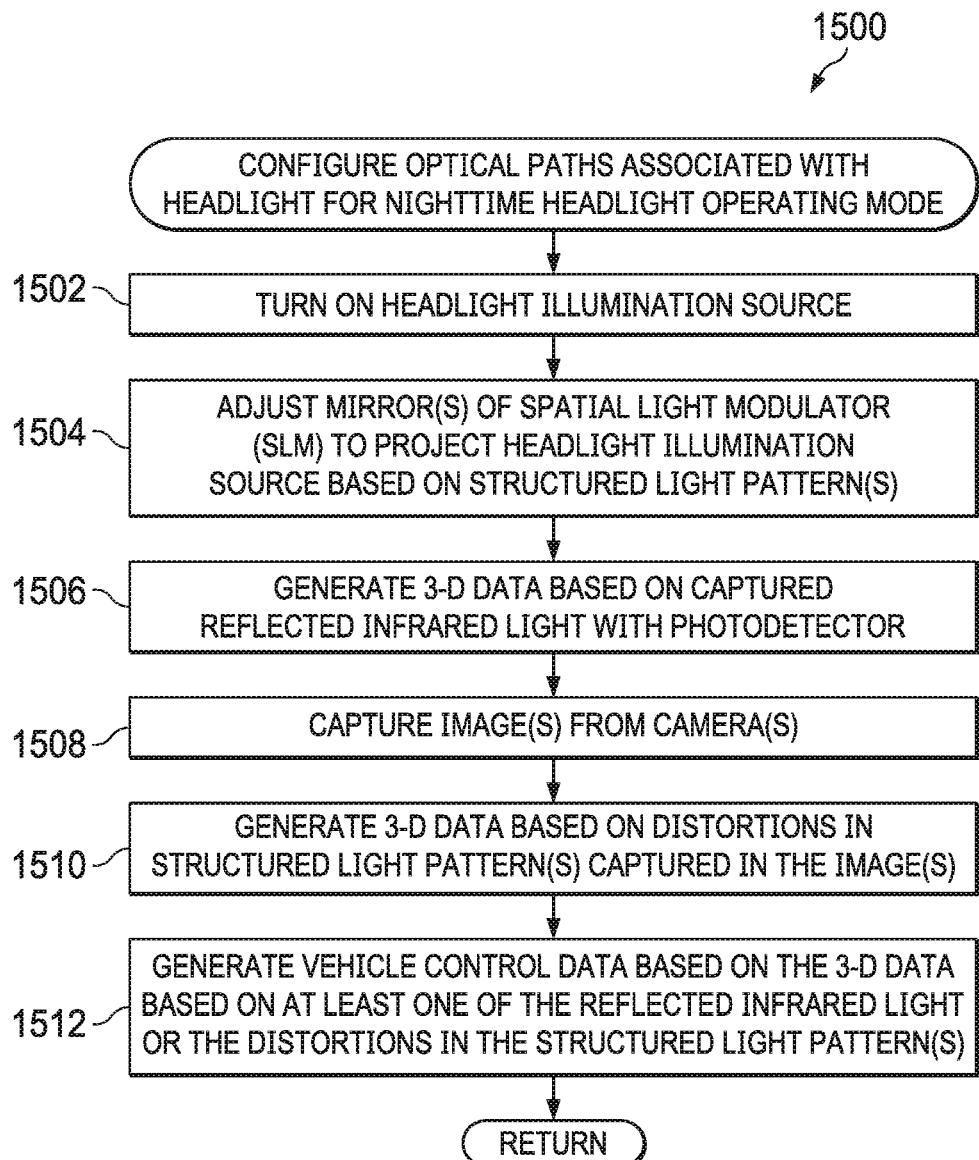
FIG. 15 is a flowchart representative of example machine readable instructions that may be executed to implement the adaptive headlights of FIGS. 1 and/or 2, the first example vehicle imaging system of FIGS. 3-4, and/or the second example vehicle imaging system of FIGS. 5-6 to configure optical paths associated with a headlight for a nighttime headlight operating mode.

FIG. 15 is a flowchart representative of example machine readable instructions 1500 that may be executed to implement the headlights 104, 105 of FIGS. 1 and/or 2, the first vehicle imaging system 300 of FIGS. 3-4, the second vehicle imaging system 500 of FIGS. 5-6, and/or the adaptive headlights 700, 702 of FIG. 7 to configure optical paths associated with a headlight for a nighttime headlight operating mode. The machine readable instructions 1500 of FIG. 15 may be executed to implement block 1310 of the machine readable instructions 1300 of FIG. 13.

The machine readable instructions 1500 of FIG. 15 begin at block 1502, at which the imaging controller 502 (FIG. 5) turns on a headlight illumination source. For example, the adaptive headlight controller 508 (FIG. 5) may instruct the light source driver 538 (FIG. 5) to turn on the light source 540 (FIG. 5).

At block 1504, the imaging controller 502 adjusts mirror(s) of a spatial light modulator (SLM) to project the headlight illumination source based on structured light pattern(s). For example, the adaptive headlight controller 508 may direct the SLM controller 534 (FIG. 5) to adjust position(s) of first one(s) of the micromirrors of the micromirror array 519 (FIG. 5) to project light from the light source 540 (FIG. 5) to an environment of the vehicle 102. In such examples, the adaptive headlight controller 508 may adjust the position(s) to time multiplex one(s) of the structured light patterns 1002, 1004, 1006 and the headlight pattern(s) 1014 of FIG. 10.

At block 1506, the imaging controller 502 generates 3-D data based on captured reflected infrared light with a photodetector. For example, the LIDAR controller 504 (FIG. 5) may generate 3-D data, such as distance measurement(s), of an object in the environment with respect to the vehicle 102 based on the reflected infrared light received by the second detector 525 (FIG. 5).

At block 1508, the imaging controller 502 captures image(s) from camera(s). For example, the camera controller 510 (FIG. 5) may control one or more instances of the camera 542 (FIG. 5) to capture one or more images of the environment.

At block 1510, the imaging controller 502 generates 3-D data based on distortions in the structured light pattern(s) captured in the image(s). For example, the camera controller 510 may generate 3-D data, such as distance measurement(s), of an object in the environment with respect to the vehicle 102 by analyzing the distortions of the light pattern 704 (FIG. 7) on the object 706 (FIG. 7).

At block 1512, the imaging controller 502 generates vehicle control data based on the 3-D data based on at least one of the reflected infrared light or the distortions in the structured light pattern(s). For example, the LIDAR controller 504 may generate vehicle control data that may be used by the vehicle 102 to facilitate control of the vehicle 102 or system(s), portion(s), etc., thereof based on the 3-D data associated with the reflected infrared light. In such examples, the vehicle 102 may control a speed, a steering direction, etc., of the vehicle 102 based on the vehicle control data. In some examples, the camera controller 510 may generate vehicle control data that may be used by the vehicle 102 to facilitate control of the vehicle 102 or system(s), portion(s), etc., thereof based on the 3-D data associated with the distortion(s) captured in the image(s). In such examples, the vehicle 102 may control a speed, a steering direction, etc., of the vehicle 102 based on the vehicle control data. In response to generating the vehicle control data at block 1512, the machine readable instructions 1500 of FIG. 15 return to block 1312 of the machine readable instructions 1300 of FIG. 13.

Figure 16:
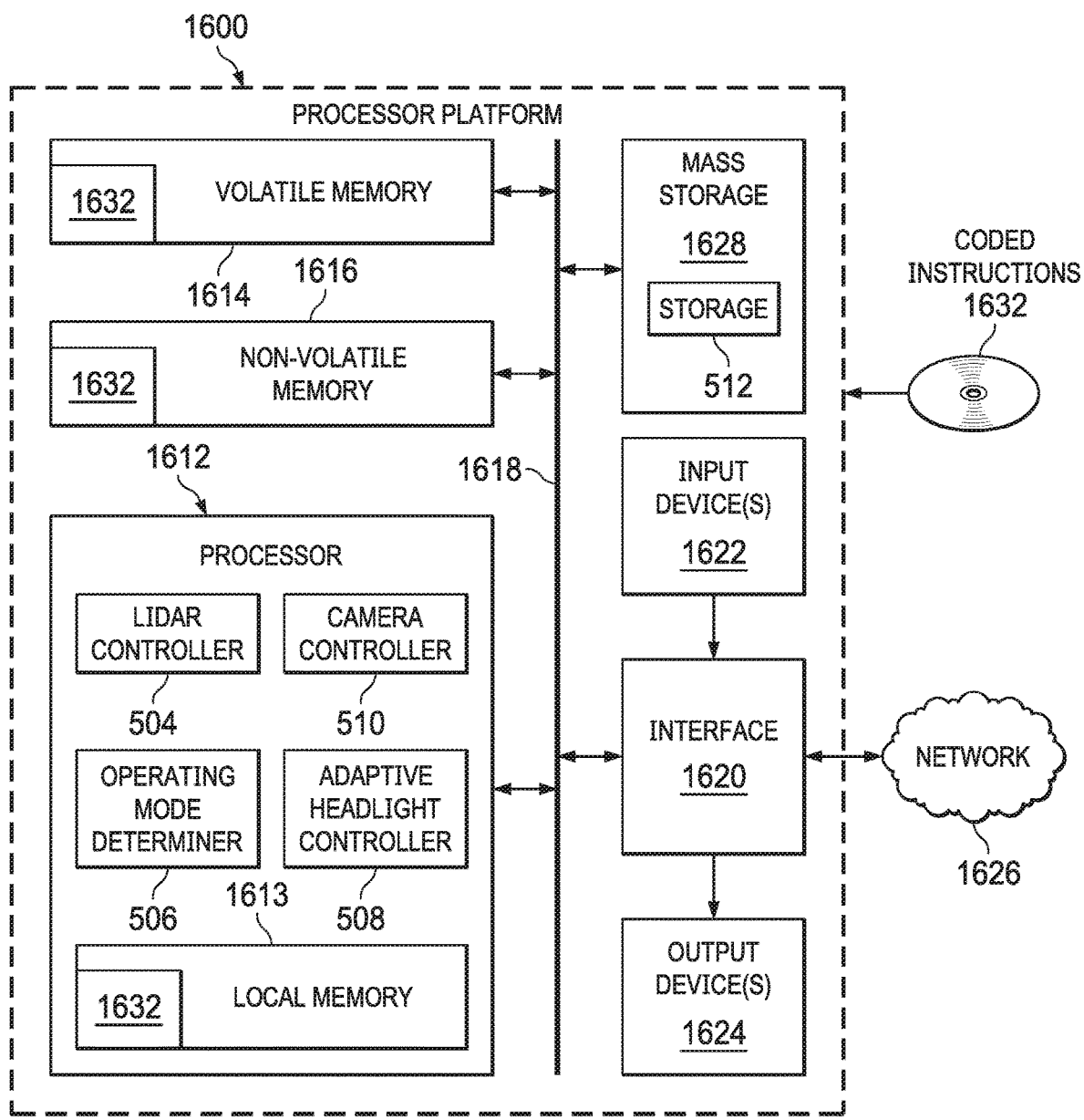
FIG. 16 is a block diagram of an example processing platform structured to execute the example machine readable instructions of FIGS. 12A-15 to implement the adaptive headlights of FIGS. 1 and/or 2, the first example vehicle imaging system of FIGS. 3-4, and/or the second example vehicle imaging system of FIGS. 5-6.

FIG. 16 is a block diagram of an example processor platform 1600 structured to execute the instructions of FIGS. 12A-15 to implement the example imaging controller 502 of FIG. 5. The processor platform 1600 may be, for example, an ECU, a server, an industrial computer, a self-learning machine (e.g., a neural network), or any other type of computing device.

The processor platform 1600 of the illustrated example includes a processor 1612. The processor 1612 of the illustrated example is hardware. For example, the processor 1612 may be implemented by one or more integrated circuits, logic circuits, microprocessors, GPUs, DSPs, or controllers from any desired family or manufacturer. The hardware processor may be a semiconductor based (e.g., silicon based) device. In this example, the processor 1612 implements the example LIDAR controller 504, the example operating mode determiner 506, the example adaptive headlight controller 508, and the example camera controller 510 of FIG. 5.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) may be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuit 1620 of the illustrated example. The output devices 1624 may be implemented, for example, by display devices (e.g., an LED, an organic light emitting diode (OLED), a liquid crystal display (LCD), a cathode ray tube (CRT) display, an in-place switching (IPS) display, a touchscreen, etc.), a tactile output device, a printer and/or speaker. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication may be via, for example, an Ethernet connection, a satellite system, a line-of-site wireless system, a cellular telephone system, etc.

The processor platform 1600 of the illustrated example also includes one or more mass storage devices 1628 for storing software and/or data. Examples of such mass storage devices 1628 include non-transitory computer readable storage media, such as floppy disk drives, hard drive disks, compact disk drives, Blu-ray disk drives, redundant array of independent disks (RAID) systems, and digital versatile disk (DVD) drives.

The machine readable instructions 1632 of FIGS. 12A-15 may be stored in the mass storage device 1628, in the volatile memory 1614, in the non-volatile memory 1616, and/or on a removable non-transitory computer readable storage medium such as a CD or DVD.

Figure 17:
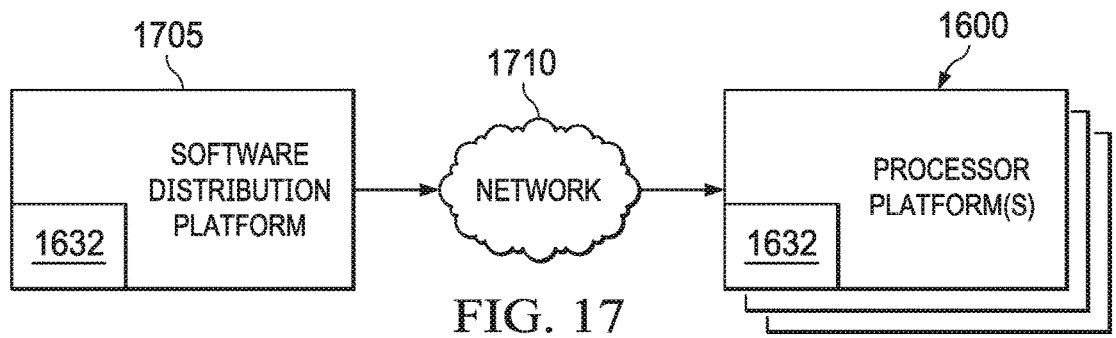
FIG. 17 is a block diagram of an example software distribution platform to distribute software (e.g., software corresponding to the example machine readable instructions of FIGS. 12A-15) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1705 to distribute software such as the example machine readable instructions 1632 of FIG. 16 to third parties is illustrated in FIG. 17. The example software distribution platform 1705 may be implemented by any computer server, data facility, cloud service, etc., capable of storing and transmitting software to other computing devices. The third parties may be customers of the entity owning and/or operating the software distribution platform 1705. For example, the entity that owns and/or operates the software distribution platform 1705 may be a developer, a seller, and/or a licensor of software such as the example machine readable instructions 1632 of FIG. 16. The third parties may be consumers, users, retailers (e.g., vehicle retailers, vehicle repair facilities, etc.), OEMs (e.g., vehicle OEMs, vehicle component OEMs, etc.), etc., who purchase and/or license the software for use and/or re-sale and/or sub-licensing. In the illustrated example, the software distribution platform 1705 includes one or more servers and one or more storage devices. The storage devices store the machine readable instructions 1632, which may correspond to the example machine readable instructions 1300, 1400, 1500 of FIGS. 12A-15, as described above. The one or more servers of the example software distribution platform 1705 are in communication with a network 1710, which may correspond to any one or more of the Internet and/or any of the example networks 132, 1626 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the machine readable instructions 1632 from the software distribution platform 1705. For example, the software, which may correspond to the example machine readable instructions 1632 of FIG. 1632, may be downloaded to the example processor platform 1600, which is to execute the machine readable instructions 1632 to implement the example imaging controller 502 of FIG. 5. In some example, one or more servers of the software distribution platform 1705 periodically offer, transmit, and/or force updates to the software (e.g., the example machine readable instructions 1632 of FIG. 16) to ensure improvements, patches, updates, etc., are distributed and applied to the software at the end user devices.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

Example systems, methods, apparatus, and articles of manufacture herein improve adaptive vehicle headlights. Examples described herein include a spatial light modulator that is able to change the patterns that it displays and/or otherwise projects onto an environment depending on time of day in order to provide different functionality. Examples described herein effectuate such different functionality by including a dichroic element that may be used to optically multiplex the spatial light modulator between the different functions. Advantageously, examples described herein improve adaptive vehicle headlights, and/or, more generally, a vehicle, to effectuate increased safety for an operator and/or passenger(s) of the vehicle.

Example methods, apparatus, systems, and articles of manufacture to effectuate adaptive vehicle headlights are disclosed herein. Further examples and combinations thereof include the following:

Example 1 includes a system comprising a photodetector, an illumination source configured to generate first light during a first operating mode, a spatial light modulator (SLM), and a dichroic filter optically coupled to the illumination source and to the SLM, wherein the dichroic filter is configured to direct the first light to the SLM, and wherein the SLM is configured to direct second light to the dichroic filter during a second operating mode, wherein the dichroic filter is configured to direct the second light having a first color to the photodetector, and direct the first light during the first operating mode.

Example 2 includes the system of example 1, wherein the first operating mode corresponds to operating the system during nighttime and the second operating mode corresponds to operating the system during daytime.

Example 3 includes the system of example 1, wherein the photodetector is a first photodetector optically coupled to the SLM, and further including a second photodetector to detect the first light based on the first operating mode.

Example 4 includes the system of example 1, wherein the photodetector is a first photodetector optically coupled to the SLM, and further including a second photodetector, a first amplifier having a first amplifier input and a first amplifier output, the first amplifier input coupled to the first photodetector, a second amplifier having a second amplifier input and a second amplifier output, the second amplifier input coupled to the second photodetector, and a multiplexer having a first multiplexer input and a second multiplexer input, the first amplifier output coupled to the first multiplexer input, the second amplifier output coupled to the second multiplexer input.

Example 5 includes the system of example 4, wherein the multiplexer has a multiplexer output and a multiplexer control, and further comprising processor circuitry coupled to the multiplexer control, the processor circuitry configured to select the first multiplexer input as the multiplexer output during the first operating mode, and select the second multiplexer input as the multiplexer output during the second operating mode.

Example 6 includes the system of example 4, wherein the multiplexer has a multiplexer output and a multiplexer control, and further comprising a converter having a converter input and a converter output, the converter input coupled to the multiplexer output, the converter being an analog-to-digital converter or a time-to-digital converter, and processor circuitry coupled to the converter output and to the multiplexer control.

Example 7 includes the system of example 1, wherein the illumination source is a light-emitting diode (LED), and further comprising processor circuitry, and a driver having a driver input and a driver output, the driver input coupled to the processor circuitry, the driver output coupled to the LED.

Example 8 includes the system of example 1, wherein the photodetector is a first photodetector, and further comprising a laser driver, a laser coupled to the laser driver, the laser configured to produce third light, the SLM configured to direct a reflection of the third light to the first photodetector during the second operating mode, the first photodetector configured to detect the reflection of the third light during the second operating mode, and a second photodetector configured to detect the reflection of the third light during the first operating mode.

Example 9 includes the system of example 1, wherein the first light is generated at a first time based on a first light pattern and the SLM is configured to direct third light from the illumination source at a third time based on a second light pattern, and further comprising a camera configured to capture a first image of the first light pattern and capture a second image of the second light pattern, and processor circuitry coupled to the camera, the processor circuitry configured to determine a first distance measurement based on a first distortion measurement associated with the first image, determine a second distance measurement based on a second distortion measurement associated with the second image, and generate three-dimensional (3-D) data based on at least one of the first distance measurement or the second distance measurement.

Example 10 includes a vehicle comprising a first headlight, and a second headlight comprising a laser configured to produce first light, an illumination source configured to produce second light, a spatial light modulator (SLM) optically coupled to the illumination source, and a controller coupled to the SLM, the controller configured to control the SLM to direct a reflection of the first light during a first operating mode, and control the SLM to direct the second light during a second operating mode.

Example 11 includes the vehicle of example 10, wherein the controller is configured to determine at least one of the first operating mode or the second operating mode based on at least one of presence of ambient light, a timestamp, a weather condition of an environment of the vehicle, or a command from an operator of the vehicle.

Example 12 includes the vehicle of example 10, further comprising a photodetector, the SLM comprising first elements and second elements, and the controller is configured to, during the first operating mode control the first elements to reflect the first light to the photodetector, and control the second elements to reflect the first light away from the photodetector.

Example 13 includes the vehicle of example 10, further comprising a first photodetector and a second photodetector, and the controller is configured to select the first photodetector to detect the first light, and disable the second photodetector responsive to selecting the first photodetector.

Example 14 includes the vehicle of example 10, the SLM comprising first elements and second elements, the vehicle further comprising a mirror and a photodetector, and the controller is configured to, during the first operating mode control the mirror to reflect the first light, control respective the first elements to reflect the first light to the photodetector, and control the second elements to reflect third light away from the photodetector.

Example 15 includes the vehicle of example 10, further including a mirror, a first photodetector, and a second photodetector, and the controller is configured to, during the second operating mode control the mirror to reflect the first light, disable the first photodetector by selecting the second photodetector to detect the first light, control the SLM to reflect the second light to generate a headlight pattern at a first time, and control the SLM to reflect the second light to generate a structured light pattern at a second time.

Example 16 includes the vehicle of example 10, the SLM comprising first elements and second elements, the vehicle further comprising a camera, and the controller is configured to control the first elements to reflect the second light to produce a first light pattern, capture a first image of the first light pattern with the camera, determine a first distance measurement based on a first distortion measurement associated with the first image, control the second elements to reflect the second light to generate a second light pattern different from the first light pattern, capture a second image of the second light pattern with the camera, determine a second distance measurement based on a second distortion measurement associated with the second image, and control the vehicle based on at least one of the first distance measurement or the second distance measurement.

Example 17 includes the vehicle of example 16, wherein the first light pattern includes first lines of the second light having a first width and the second light pattern includes second lines of the second light having a second width different from the first width.

Example 18 includes the vehicle of example 10, wherein the first headlight comprises a first camera and the second headlight comprises a second camera, the first operating mode is a daytime operating mode, and the controller is configured to capture a first image with the first camera, capture a second image with the second camera, generate a stereo image based on the first image and the second image, generate three-dimensional data based on the stereo image, and control the vehicle based on the three-dimensional data.

Example 19 includes a method comprising controlling a micromirror array to reflect first light from a laser of a headlight based on a first operating mode of the headlight, and controlling the micromirror array to reflect second light from an illumination source of the headlight based on a second operating mode of the headlight.

Example 20 includes the method of example 19, wherein the headlight is included in a vehicle, and further including determining a timestamp, determining a weather condition of an environment of the vehicle, and determining whether a command has been obtained from an operator of the vehicle, the determination of the first operating mode or the second operating mode based on at least one of the timestamp, the weather condition, or the command.

Example 21 includes the method of example 19, wherein the micromirror array includes micromirrors, and further including, in response to determining the first operating mode controlling first ones of the micromirrors to reflect the first light to a photodetector, and controlling second ones of the micromirrors to reflect ambient light away from the photodetector.

Example 22 includes the method of example 19, further including, in response to determining the second operating mode controlling a laser mirror to reflect the first light from a laser, selecting a first photodetector of the headlight to detect the first light, disabling a second photodetector of the headlight based on the selection, controlling the micromirror array to reflect the second light to generate a headlight pattern at a first time, and controlling the micromirror array to reflect the second light to generate a structured light pattern at a second time after the first time.

Example 23 includes the method of example 19, further including, in response to determining the second operating mode controlling a first set of micromirrors of the micromirror array to reflect a first light pattern, obtaining a first image of the first light pattern from a camera, determining a first distance measurement based on a first distortion measurement associated with the first image, controlling a second set of micromirrors of the micromirror array to reflect a second light pattern different from the first light pattern, obtaining a second image of the second light pattern from the camera, and determining a second distance measurement based on a second distortion measurement associated with the second image.

Example 24 includes the method of example 23, wherein the first light pattern includes first lines of the second light having a first width and the second light pattern includes second lines of the second light having a second width different from the first width.

Example 25 includes the method of example 19, wherein the headlight is a first headlight, the first operating mode is a daytime operating mode, further including obtaining a first image from a first camera of the first headlight, obtaining a second image from a second camera of a second headlight, generating a stereo image based on the first image and the second image, and generating three-dimensional data based on the stereo image.

Modifications are possible in the described embodiments, and other embodiments are possible, within the scope of the claims.

What is claimed is:

1. A system comprising:
   a photodetector;
   an illumination source configured to generate a first light during a first operating mode;
   a spatial light modulator (SLM); and
   a dichroic filter optically coupled to the illumination source and to the SLM, wherein the dichroic filter is configured to direct the first light towards the SLM; and
   wherein the SLM is configured to:
   direct a second light towards the dichroic filter during a second operating mode, wherein the dichroic filter is configured to direct the second light having a first color towards the photodetector; and
   direct the first light during the first operating mode.

2. The system of claim 1, wherein the first operating mode corresponds to operating the system during nighttime and the second operating mode corresponds to operating the system during daytime.

3. The system of claim 1, wherein the photodetector is a first photodetector optically coupled to the SLM, and further including a second photodetector to detect the first light during the first operating mode.

4. The system of claim 1, wherein the photodetector is a first photodetector optically coupled to the SLM, and further including:
   a second photodetector;
   a first amplifier having a first amplifier input and a first amplifier output, the first amplifier input coupled to the first photodetector;
   a second amplifier having a second amplifier input and a second amplifier output, the second amplifier input coupled to the second photodetector; and
   a multiplexer having a first multiplexer input and a second multiplexer input, the first amplifier output coupled to the first multiplexer input, the second amplifier output coupled to the second multiplexer input.

5. The system of claim 4, wherein the multiplexer has a multiplexer output and a multiplexer control, and further comprising processor circuitry coupled to the multiplexer control, the processor circuitry configured to:
   select the first multiplexer input as the multiplexer output during the first operating mode; and
   select the second multiplexer input as the multiplexer output during the second operating mode.

6. The system of claim 4, wherein the multiplexer has a multiplexer output and a multiplexer control, and further comprising:
   a converter having a converter input and a converter output, the converter input coupled to the multiplexer output, the converter being an analog-to-digital converter or a time-to-digital converter; and processor circuitry coupled to the converter output and to the multiplexer control.

7. The system of claim 1, wherein the illumination source is a light-emitting diode (LED), and further comprising:
   processor circuitry; and
   a driver having a driver input and a driver output, the driver input coupled to the processor circuitry, the driver output coupled to the LED.

8. The system of claim 1, wherein the photodetector is a first photodetector, and further comprising:
   a laser driver;
   a laser coupled to the laser driver, the laser configured to produce a third light, the SLM configured to direct a reflection of the third light to the first photodetector during the second operating mode, the first photodetector configured to detect the reflection of the third light during the second operating mode; and
   a second photodetector configured to detect the reflection of the third light during the first operating mode.

9. The system of claim 1, wherein the first light is generated at a first time based on a first light pattern and the SLM is configured to direct a third light from the illumination source at a third time based on a second light pattern, and further comprising:
   a camera configured to capture a first image of the first light pattern and capture a second image of the second light pattern; and
   processor circuitry coupled to the camera, the processor circuitry configured to:
      determine a first distance measurement based on a first distortion measurement associated with the first image;
      determine a second distance measurement based on a second distortion measurement associated with the second image; and
      generate three-dimensional (3-D) data based on at least one of the first distance measurement or the second distance measurement.

10. A system comprising:
    a spatial light modulator (SLM);
    a light source configured to produce a first light having a first wavelength;
    a dichroic filter optically coupled to the light source and to the SLM, the dichroic filter configured to direct the first light towards the SLM, the SLM configured to modulate the first light to produce first modulated light; and
    a photodetector optically coupled to the dichroic filter;
    the SLM configured to:
       receive a second light having a second wavelength different that the first wavelength; and
       modulate the second light to produce second modulated light; and
    the dichroic filter configured to direct the second modulated light towards the photodetector.

11. The system of claim 10, further comprising:
    a controller coupled to the SLM; and
    an electronic control unit (ECU) coupled to the controller, the ECU configured to:
       instruct the controller to control the SLM to modulate the first light during a first mode of operation; and
       instruct the controller to control the SLM to modulate the second light during a second mode of operation.

12. The system of claim 11, wherein the ECU is further configured to select the first mode of operation or the second mode of operation based on an amount of ambient light, a timestamp, a weather condition, or receiving a command.

13. The system of claim 11, wherein the photodetector is a first photodetector, the system further comprising a second photodetector coupled to the ECU, wherein the ECU is configured to:
    disable the second photodetector during the second mode of operation; and
    enable the first photodetector during the second mode of operation.

14. The system of claim 13, further comprising:
    a first trans-impedance amplifier (TCA) coupled to the first photodetector;
    a second TIA coupled to the second photodetector; and
    a multiplexer coupled to the first TIA, to the second TIA, and to the ECU.

15. The system of claim 11, further comprising a laser coupled to the ECU, the laser configured to produce the second light.

16. The system of claim 11, wherein the first modulated light is a structured light pattern, the system further comprising a camera coupled to the ECU, the camera configured to receive a reflection of the structured light pattern.

17. The system of claim 11, wherein the first mode of operation is nighttime operation and the second mode of operation is daytime operation.

18. The system of claim 10, further comprising a projection lens coupled to the SLM, the projection lens configured to:
    project the first modulated light; and
    direct the second light towards the SLM.

19. The system of claim 10, further comprising a biconic mirror optically coupled between the SLM and the dichroic filter.

20. A vehicle comprising:
    a headlight comprising:
       a spatial light modulator (SLM);
       a light source configured to produce a first light having a first wavelength;
       a dichroic filter optically coupled to the light source and to the SLM, the dichroic filter configured to direct the first light towards the SLM, the SLM configured to modulate the first light to produce first modulated light; and
       a photodetector optically coupled to the dichroic filter;
       the SLM configured to:
          receive a second light having a second wavelength different that the first wavelength; and
          modulate the second light to produce second modulated light; and
       the dichroic filter configured to direct the second modulated light towards the photodetector.

21. The vehicle of claim 20, the headlight further comprising:
    a controller coupled to the SLM; and
    an electronic control unit (ECU) coupled to the controller, the ECU configured to:
       instruct the controller to control the SLM to modulate the first light during a first mode of operation; and
       instruct the controller to control the SLM to modulate the second light during a second mode of operation.

22. The vehicle of claim 21, wherein the ECU is further configured to select the first mode of operation or the second mode of operation based on an amount of ambient light, a timestamp, a weather condition, or receiving a command.

23. The vehicle of claim 21, wherein the photodetector is a first photodetector the headlight further comprising a second photodetector coupled to the ECU, wherein the ECU is configured to:

disable the second photodetector during the second mode of operation; and enable the first photodetector during the second mode of operation.

24. The vehicle of claim 23, the headlight further comprising:
   a first trans-impedance amplifier (TCA) coupled to the first photodetector;
   a second TIA coupled to the second photodetector; and
   a multiplexer coupled to the first TIA, to the second TIA, and to the ECU.

25. The vehicle of claim 21, the headlight further comprising a laser coupled to the ECU, the laser configured to produce the second light.

26. The vehicle of claim 21, wherein the first modulated light is a structured light pattern, the headlight further comprising a camera coupled to the ECU, the camera configured to receive a reflection of the structured light pattern.

27. The vehicle of claim 20, the headlight further comprising a projection lens coupled to the SLM, the projection lens configured to:
   project the first modulated light; and
   direct the second light towards the SLM.

* * * * *